US010352544B2

(12) United States Patent
Myers

(10) Patent No.: US 10,352,544 B2
(45) Date of Patent: *Jul. 16, 2019

(54) FIELD-SERVICEABLE FLAT PANEL LIGHTING DEVICE

(71) Applicant: UNITY OPTO TECHNOLOGY CO., LTD., New Taipei (TW)

(72) Inventor: J. Richard Myers, Pasadena, CA (US)

(73) Assignee: Unity Opto Technology Co., Ltd. (TW)

(*) Notice: Subject to any disclaimer, the term of this patent is extended or adjusted under 35 U.S.C. 154(b) by 169 days.

This patent is subject to a terminal disclaimer.

(21) Appl. No.: 15/405,947

(22) Filed: Jan. 13, 2017

(65) Prior Publication Data
US 2017/0146224 A1 May 25, 2017

Related U.S. Application Data

(63) Continuation of application No. 14/517,676, filed on Oct. 17, 2014, now Pat. No. 9,546,781, which is a (Continued)

(51) Int. Cl.
F21V 8/00 (2006.01)
F21V 15/01 (2006.01)
(Continued)

(52) U.S. Cl.
CPC .............. F21V 23/06 (2013.01); F21V 15/01 (2013.01); F21V 23/002 (2013.01);
(Continued)

(58) Field of Classification Search
CPC ..... G02B 6/0083; F21V 15/01; F21V 23/002; F21V 23/003; F21V 23/006; F21V 23/02;
(Continued)

(56) References Cited

U.S. PATENT DOCUMENTS 3,892,959 A 7/1975 Pulles
4,975,809 A 12/1990 Ku
(Continued)

FOREIGN PATENT DOCUMENTS

CN 201225561 4/2009
CN 201513783 6/2010
(Continued)

OTHER PUBLICATIONS

International Preliminary Report on Patentability dated Oct. 20, 2015 corresponding to International Patent Application No. PCT/US2014/033352, 11 pages.
(Continued)

Primary Examiner — Peggy A Neils
(74) Attorney, Agent, or Firm — Eric L. Sophir; Dentons US LLP

(57) ABSTRACT

The light fixture includes a light emitting panel assembly including a frame and a substantially flat light emitting diode (LED) panel disposed within the frame. The substantially flat light emitting diode (LED) panel has an array of light emitting diodes (LEDs). The light fixture further includes a power circuitry module, with a power circuit. The power circuitry module is disposed within the frame adjacent an edge of the frame, and is releasably attachable to the light emitting panel assembly. A decouplable source electrical connector electrically couples the power circuit to an AC power supply external to the light fixture, and a decouplable driver electrical connector electrically couples the power circuit to the array of light emitting diodes (LEDs). The source electrical connector and driver electrical connector may be configured to be decoupled as the power circuitry module is detached and separated from the light emitting panel assembly.

17 Claims, 21 Drawing Sheets

Related U.S. Application Data continuation-in-part of application No. 14/248,197, filed on Apr. 8, 2014, now abandoned.

(60) Provisional application No. 61/812,973, filed on Apr. 17, 2013, provisional application No. 61/917,102, filed on Dec. 17, 2013.

(51) Int. Cl.

| | |
|---|---|
| *F21V 23/00* | (2015.01) |
| *F21V 23/02* | (2006.01) |
| *F21V 23/06* | (2006.01) |
| *F21V 29/83* | (2015.01) |
| *F21V 29/89* | (2015.01) |
| *F21Y 101/00* | (2016.01) |
| *F21Y 103/10* | (2016.01) |
| *F21Y 105/00* | (2016.01) |
| *F21Y 115/10* | (2016.01) |

(52) U.S. Cl.
CPC .......... *F21V 23/003* (2013.01); *F21V 23/006* (2013.01); *F21V 23/02* (2013.01); *F21V 23/023* (2013.01); *F21V 29/83* (2015.01); *F21V 29/89* (2015.01); *G02B 6/0043* (2013.01); *G02B 6/0051* (2013.01); *G02B 6/0055* (2013.01); *G02B 6/0083* (2013.01); *F21Y 2101/00* (2013.01); *F21Y 2103/10* (2016.08); *F21Y 2105/00* (2013.01); *F21Y 2115/10* (2016.08)

(58) Field of Classification Search
CPC ........ F21V 23/023; F21V 23/06; F21V 29/83; F21Y 2101/00; F21Y 2105/00; F21Y 2103/10

See application file for complete search history.

(56) References Cited

U.S. PATENT DOCUMENTS

| | | | |
|---|---|---|---|
| 5,027,258 A | 6/1991 | Schoniger et al. | |
| 5,276,591 A | 1/1994 | Hegarty | |
| 5,375,043 A | 12/1994 | Tokunaga | |
| 5,636,462 A | 6/1997 | Kleiman | |
| 5,641,219 A | 6/1997 | Mizobe | |
| 5,806,972 A | 9/1998 | Kaiser et al. | |
| 6,042,243 A | 3/2000 | Grill et al. | |
| 6,072,280 A | 6/2000 | Allen | |
| 6,095,660 A | 8/2000 | Moriyama et al. | |
| 6,231,213 B1 | 5/2001 | Schmidt et al. | |
| 6,240,665 B1 | 6/2001 | Brown et al. | |
| 6,641,283 B1 | 11/2003 | Bohler | |
| 6,739,734 B1 | 5/2004 | Hulgan | |
| 6,758,573 B1 | 7/2004 | Thomas et al. | |
| 6,840,646 B2 | 1/2005 | Cornelissen et al. | |
| 6,880,963 B2 | 4/2005 | Luig et al. | |
| 6,997,576 B1 | 2/2006 | Lodhie et al. | |
| 7,015,987 B2 | 3/2006 | Wu et al. | |
| 7,090,387 B2 | 8/2006 | Kohno | |
| 7,114,841 B2 | 10/2006 | Aanegola et al. | |
| 7,172,324 B2 | 2/2007 | Wu et al. | |
| 7,201,488 B2 | 4/2007 | Sakamoto et al. | |
| 7,217,004 B2 | 5/2007 | Park et al. | |
| 7,236,155 B2 | 6/2007 | Han et al. | |
| 7,374,327 B2 | 5/2008 | Schexnaider | |
| 7,387,403 B2 | 6/2008 | Mighetto | |
| 7,445,369 B2 | 11/2008 | Yu et al. | |
| 7,448,768 B2 | 11/2008 | Sloan et al. | |
| 7,473,022 B2 | 1/2009 | Yoo | |
| 7,547,112 B2 | 6/2009 | Kim | |
| 7,563,015 B2 | 7/2009 | Tzung-Shiun | |
| 7,570,313 B2 | 8/2009 | Wu et al. | |
| 7,583,901 B2 | 9/2009 | Nakagawa et al. | |
| 7,604,389 B2 | 10/2009 | Sakai et al. | |
| 7,708,447 B2 | 5/2010 | Tobler et al. | |
| 7,722,221 B2 | 5/2010 | Chae | |
| 7,726,617 B2 | 6/2010 | Zambelli et al. | |
| 7,752,790 B1 | 7/2010 | Michael et al. | |
| 7,766,536 B2 | 8/2010 | Peifer et al. | |
| 7,787,070 B2 | 8/2010 | Choi et al. | |
| 7,802,913 B2* | 9/2010 | Tsai | F21K 9/00 349/65 |
| 7,814,341 B1 | 10/2010 | Corder | |
| 7,825,892 B2 | 11/2010 | Lin et al. | |
| 7,894,013 B2 | 2/2011 | Chung et al. | |
| 7,918,598 B2 | 4/2011 | Peifer et al. | |
| 8,029,293 B2 | 10/2011 | Janos et al. | |
| 8,061,867 B2 | 11/2011 | Kim et al. | |
| D653,376 S | 1/2012 | Kong et al. | |
| 8,092,034 B2 | 1/2012 | Zarian et al. | |
| 8,092,069 B2 | 1/2012 | Chuang et al. | |
| 8,096,671 B1 | 1/2012 | Cronk et al. | |
| 8,136,958 B2 | 3/2012 | Verfuerth et al. | |
| 8,167,627 B1 | 5/2012 | Janos et al. | |
| 8,443,535 B2 | 5/2013 | Liu et al. | |
| 8,556,466 B2* | 10/2013 | Shin | F21V 3/02 361/713 |
| 8,915,636 B2 | 12/2014 | Araki et al. | |
| 9,062,867 B2 | 6/2015 | Rodgers et al. | |
| 9,068,704 B2 | 6/2015 | Burton et al. | |
| 9,206,964 B2 | 12/2015 | Marsh et al. | |
| 9,423,113 B2 | 8/2016 | Myers et al. | |
| 9,441,801 B1 | 9/2016 | Myers et al. | |
| 9,447,954 B2 | 9/2016 | Myers et al. | |
| 9,453,616 B2 | 9/2016 | Myers et al. | |
| 9,523,487 B1 | 12/2016 | Myers et al. | |
| 9,664,365 B2 | 5/2017 | Myers et al. | |
| 9,976,732 B2 | 5/2018 | Myers et al. | |
| 2004/0240230 A1 | 12/2004 | Kitajima et al. | |
| 2005/0082453 A1 | 4/2005 | Chuang | |
| 2005/0174755 A1 | 8/2005 | Becker | |
| 2005/0180172 A1 | 8/2005 | Jang | |
| 2005/0219860 A1 | 10/2005 | Schexnaider | |
| 2006/0022214 A1 | 2/2006 | Morgan et al. | |
| 2006/0158906 A1 | 7/2006 | Parker | |
| 2006/0291238 A1 | 12/2006 | Epstein et al. | |
| 2006/0291241 A1 | 12/2006 | Wojtowicz et al. | |
| 2007/0000849 A1 | 1/2007 | Lutz et al. | |
| 2007/0047262 A1 | 3/2007 | Schardt et al. | |
| 2007/0076431 A1 | 4/2007 | Atarashi et al. | |
| 2007/0097227 A1 | 5/2007 | Toyokawa | |
| 2007/0115402 A1 | 5/2007 | Zhang et al. | |
| 2007/0165424 A1 | 7/2007 | Sakai | |
| 2007/0171670 A1 | 7/2007 | Zagar et al. | |
| 2007/0222914 A1 | 9/2007 | Kotchick et al. | |
| 2007/0247414 A1 | 10/2007 | Roberts | |
| 2007/0247842 A1 | 10/2007 | Zampini et al. | |
| 2007/0247870 A1 | 10/2007 | Sakai et al. | |
| 2008/0013303 A1 | 1/2008 | Guarino | |
| 2008/0101094 A1 | 5/2008 | Spada et al. | |
| 2008/0231196 A1 | 9/2008 | Weng et al. | |
| 2008/0297679 A1 | 12/2008 | Jung et al. | |
| 2009/0097277 A1 | 4/2009 | Iwasaki | |
| 2009/0135608 A1 | 5/2009 | Sell | |
| 2009/0147504 A1 | 6/2009 | Teeters | |
| 2009/0147507 A1 | 6/2009 | Verfuerth et al. | |
| 2009/0213589 A1 | 8/2009 | Peifer et al. | |
| 2009/0287631 A1 | 11/2009 | Emler | |
| 2009/0316396 A1 | 12/2009 | Tsai | |
| 2009/0323334 A1 | 12/2009 | Roberts et al. | |
| 2010/0061108 A1 | 3/2010 | Zhang | |
| 2010/0124064 A1 | 5/2010 | Ogawa et al. | |
| 2010/0142202 A1 | 6/2010 | Sugishita et al. | |
| 2010/0157610 A1 | 6/2010 | Xiao et al. | |
| 2010/0165241 A1 | 7/2010 | Kim et al. | |
| 2010/0171145 A1 | 7/2010 | Morgan et al. | |
| 2010/0172138 A1 | 7/2010 | Richardson | |
| 2010/0176742 A1 | 7/2010 | Lee et al. | |
| 2010/0237798 A1 | 9/2010 | Wolf et al. | |
| 2010/0284185 A1 | 11/2010 | Ngai | |
| 2010/0289428 A1 | 11/2010 | Frazier et al. | |
| 2010/0315833 A1 | 12/2010 | Holman et al. | |
| 2011/0068708 A1 | 3/2011 | Coplin et al. | |

(56) References Cited

U.S. PATENT DOCUMENTS

| | | | |
|---|---|---|---|
| 2011/0075414 | A1 | 3/2011 | Van De Ven et al. |
| 2011/0138665 | A1 | 6/2011 | Liu |
| 2011/0149596 | A1 | 6/2011 | Lv et al. |
| 2011/0279063 | A1 | 11/2011 | Wang et al. |
| 2011/0291569 | A1 | 12/2011 | Shin et al. |
| 2012/0020109 | A1 | 1/2012 | Kim et al. |
| 2012/0081889 | A1 | 4/2012 | Frost et al. |
| 2012/0091919 | A1 | 4/2012 | Tveit |
| 2012/0106177 | A1 | 5/2012 | Blankestijn et al. |
| 2012/0182733 | A1 | 7/2012 | Cho |
| 2012/0218746 | A1 | 8/2012 | Winton |
| 2012/0287631 | A1 | 11/2012 | Sheng |
| 2012/0320627 | A1 | 12/2012 | Araki et al. |
| 2012/0328242 | A1 | 12/2012 | Hesse |
| 2013/0038211 | A1 | 2/2013 | Kang |
| 2013/0044512 | A1 | 2/2013 | Araki et al. |
| 2013/0070455 | A1 | 3/2013 | Tsui et al. |
| 2013/0258706 | A1 | 10/2013 | Urtiga et al. |
| 2014/0240966 | A1 | 8/2014 | Garcia et al. |
| 2014/0268872 | A1 | 9/2014 | Holman et al. |
| 2014/0313780 | A1 | 10/2014 | Myers |
| 2014/0376266 | A1 | 12/2014 | Myers |
| 2015/0049512 | A1 | 2/2015 | Myers et al. |
| 2016/0356467 | A1 | 12/2016 | Myers et al. |
| 2017/0097147 | A1 | 4/2017 | Myers et al. |

FOREIGN PATENT DOCUMENTS

| | | |
|---|---|---|
| CN | 201628158 | 11/2010 |
| CN | 201724032 | 1/2011 |
| DE | 102006001981 A1 | 8/2007 |
| DE | 102008003703 A1 | 7/2009 |
| DE | 202009007334 | 9/2009 |
| DE | 102009021846 A1 | 12/2010 |
| DE | 102010006465 | 8/2011 |
| DE | 102010008359 | 8/2011 |
| DE | 202012103430 | 9/2012 |
| EP | 1059484 | 12/2000 |
| EP | 1906081 | 4/2008 |
| EP | 2088835 | 8/2009 |
| EP | 2131100 | 12/2009 |
| EP | 1361391 | 4/2010 |
| EP | 2270387 | 9/2011 |
| EP | 2495490 | 9/2012 |
| JP | 2004-271734 | 9/2004 |
| JP | 2004-335426 | 11/2004 |
| JP | 2006-106212 | 4/2006 |
| JP | 3140783 | 4/2008 |
| JP | 2011-138731 | 7/2011 |
| WO | 2009/017117 | 2/2009 |
| WO | 2009/102563 | 8/2009 |
| WO | 2010/133535 | 11/2010 |
| WO | 2012/113005 | 8/2012 |
| WO | 2012/125605 | 9/2012 |
| WO | 2012/158894 | 11/2012 |
| WO | 2012/158908 | 11/2012 |

OTHER PUBLICATIONS

International Preliminary Report on Patentability dated Oct. 20, 2015 corresponding to International Patent Application No. PCT/US2014/033953, 8 pages.

Communication and Annex from the Examining Division dated Sep. 17, 2015 corresponding to European Patent Application No. 12 726 949.6, 5 pages.

ATG Electronics Corp., "iBright Flat LED Panel", website description, undated; downloaded from http://www.atgelectronics.com/lighting/Illumination/LEDTroffer/Flat-LED-Panel.html on Apr. 25, 2013; 9 pages.

Delta Electronics, "General Lighting: LED Lighting Solutions", product brochure, undated; downloaded from http://www.delta.com.tw/product/rd/led/products/luminaire/lum_fl01.asp on Mar. 30, 2012; 2 pages.

Dongbu Lightec, LED Light Panel Installation Guide, undated; downloaded from http://www.dongbulightec.ca/English/Products/LED_L_P_Tech.html on Mar. 30, 2012; 5 pages.

Dongbu Lightec, "LumiSheet Lamp", pamphlet from Lightfair International (LFI) on Apr. 23-25, 2013; 9 pages.

ELumination, "Custom LED Light Panels", undated; downloaded from www.elumanation.com on Dec. 4, 2012; 1 page.

Energetic Lighting, "LED Panel Light", product features for ELEP2×250 and ELEP2×450, undated; downloaded from www.energeticlighting.com on Mar. 30, 2012; 1 page.

Enlight Corporation, "Ultraslim LED Panel Light", website description, undated; downloaded from http://twe.enlightcorp.com on Apr. 25, 2013; 2 pages.

Foshan Sunbay Opto Electronics Co., Ltd., "Super Thin and Driver Inside 300*300 22W LED Panel Light", undated; originally downloaded from http://sunbayled.en.made-in-china.com/product/vBxnWSXobmhY/China-Super-Thin-and-Driver-Inside-300-300-22W-LED-Panel-Light.html on Apr. 20, 2013; 3 pages.

GE Lighting Solutions, "GE Lighting Flat LED Panel", undated; downloaded on Jan. 16, 2012; 10 pages.

GE Lighting Solutions, "Lumination LED Luminaires—Troffer", undated; downloaded from http://www.gelightingsolutions.com/Indoor/id-456789e/Lumination_LED_Luminaires_-_Troffer on Jul. 12, 2012; 2 pages.

GE Lighting Solutions, specification sheet for the 2×2 Edgelighting Fixture for troffer fixtures, pamphlet from Lightfair International (LFI) on May 17-19, 2011; 1 page.

General Lighting Electronic Co., LTD, LED Panel Light specifications for 60w 600×600, undated; originally downloaded from http://www.gl-leds.com/led-news/led-panel-light-60w-600×600-01.html on Jun. 6, 2011; 3 pages.

General Lighting Electronic Co., "LED Light Panel List", undated; originally downloaded from http://www.gl-leds.com/led-panel-light-list.html on Apr. 23, 2013; 2 pages.

Global Lighting Technologies Inc., "LED Edge Lighting", pamphlet from Lightfair International (LFI) on Apr. 23-25, 2013; 12 pages.

Green Led Lighting Solutions Inc., "LED Light Panel: Ultra Thin LED Light Box (Built in Power Supply)", product brochure, undated; downloaded from www.ledlightpanel.com on Apr. 23, 2013; 1 page.

Intematix Corporation, "Customer Case Study—Tech Lighting Unilume: Innovation for Undercabinet Lighting", brochure of Intematix for its Intematix ChromalitTM remote phosphor LEDs technology, undated; downloaded from www.intematix.com on Mar. 19, 3013; 2 pages.

Luminousfilm.com, a Knema, LLC company, "LED Light Panels Information", website description, undated; originally downloaded from http://www.luminousfilm.com/led.htm on Mar. 19, 2013; 5 pages.

Maxim Lighting; website description of LED flat lights, undated; originally downloaded from http://www.maximlighting.com/ on Mar. 19, 2013; 2 pages.

Maxim Lighting, "CounterMax StarStrand Counter, Accent & Task Lighting Solutions", copyright 2012; originally downloaded from http://www.maximlighting.com/catalog_pdf.aspx?c=brochure&n=LMXBRO1203.pdf on Mar. 19, 2013; pp. 1-5, 11-14; 10 pages.

Maxlite, specification sheet for 2×4 flat light, pamphlet from Lightfair International (LFI) on May 17-19, 2011 ; 1 page.

Maxlite, advertisement for maxLED Flat Panel 2×2, 2×4, and 1×4 models, for Lightfair International (LFI) on May 17-19, 2011; 5 pages.

Modular International Inc., "LED Panels", product brochure, undated; downloaded from http://www.modularinternational.com/literature.php on Mar. 6, 2009; 2 pages.

National Specialty Lighting, "LED Task Star", product brochure, undated; downloaded from http://www.nslusa.com/ on Mar. 19, 2013; 1 page.

Nicor Lighting "T2LED 2×2 Troffer", product brochure, undated; downloaded from nicorlighting.com/uploads/.../t2-led-2×2-troffer-lumen-maintenance.pdf on Apr. 25, 2013; 1 page.

Nicor Lighting, "2013 Catalog Multifamily, Assisted Living, & Hospitality Lighting Products", copyright 2013, pamphlet from Lightfair International (LFI) on Apr. 23-25, 2013; pp. 1-4, 31; 7 pages.

(56) References Cited

OTHER PUBLICATIONS

Noke LED Lighting Technology Co., Ltd., "Ceiling Light 650×650mm", website description, undated; originally downloaded from http://www.nokeled.com/products/Ceiling-light-650×650mm.html on Jun. 11, 2012; 2 pages.
Patent Cooperation Treaty, "Invitation To Pay Additional Fees And, Where Applicable, Protest Fee", partial international search report for international application No. PCT/US2012/038338, dated Sep. 19, 2012; 7 pages.
Patent Cooperation Treaty, "International Search Report", international search report for international application No. PCT/US2012/038338, dated Feb. 18, 2013; 7 pages.
Patent Cooperation Treaty, Invitation To Pay Additional Fees And, Where Applicable, Protest Fee, partial international search report for international application No. PCT/US2012/038315, dated Sep. 19, 2012; 9 pages.
Patent Cooperation Treaty, "International Search Report", international search report for international application No. PCT/US2012/038315, dated Feb. 13, 2013; 9 pages.
Rambus, "LED Light Bulbs", website description, Jan. 17, 2013; originally downloaded from http://www.rambus.com/us/technology/solutions/led-lightbulb/index.html?utm_source=Rambus+Contacts&utm campaign=99dc5a0773-Technology_Bulb_Imerz_Launchl 17 2013&utm_mejiunn=email on Feb. 12, 2013; 2 pages.
Shenzhen Borsche Electronic Co., Ltd., "LED Panel Light", product catalog, undated; originally downloaded from http://cnhidee.en.made-in-china.com/product-group/pqeQkYCcXtVIQLED-Panel-Light-catalog-1.htnnl on Apr. 30, 2013; 3 pages.
Stellaray Technology Limited, "Flat LED Panel", published Mar. 19, 2012; downloaded from http://www.srleds.com/e/products/LED_Panel Lights/led_panel_lights.html on Apr. 12, 2012; 26 pages.
Taiwan T-LUX Technology Co., LTD, "BTHx Series Specification Sheet", Issued Oct. 12, 2010 and Modified Mar. 1, 2011; downloaded from http://www.t-lux.com.tw on Nov. 2, 2011; 7 pages.
Tech Lighting, a Generation Brands Company, "Unilume LED Undercabinet", product brochure and installation instructions, undated; downloaded on www.techlighting.com on Mar. 19, 2013; 6 pages.
Unity Opto Technology Co., Ltd., "Product Specification: UNi Ceiling Lighting I 2020", Jan. 7, 2011; downloaded from http://www.unityopto.com.tw/ on Mar. 19, 2013; 5 pages.
Unity Opto Technology Co., Ltd., "Product Specification: Ceiling Lighting 6060", Nov. 24, 2010; downloaded from http://www.unityopto.com.tw/ on Mar. 19, 2013; 4 pages.
Zenaro "Axenia-Modul 600 40W", website description, undated; downloaded from http://europe.zenaroled.com/en/products/europe/office-lights/itemlist/category/82-axenia on Jun. 22, 2012; 1 page.
BANQ Technology Co., Ltd., "300*300 Second Generation LED Panel Light," website description, copyright 2013; downloaded from http://www.bangcn.com/product-141.html on Oct. 28, 2013; email received from website owner on Oct. 9, 2013; 6 pages.
BBF Hitech Intl Co., Ltd, "300×300×11mm," website description, copyright 2010; downloaded from http://www.bbfled.com/productshow_386.html on Oct. 28, 2013; email received from website owner on Sep. 7, 2013; 2 pages.
Bravoled Lighting Manufacturing Co., Limited, "Bravoled, BL-P6-10W ANS," website description, copyright 2010; downloaded from http://www.bravoled.com/html/prsO/t287-310/c565.html on Oct. 28, 2013; email received from website owner on Sep. 26, 2013; 2 pages.
Chinese CleanTech Components Company Ltd, CCTCC, "CTC-300/1200W," website description, undated; downloaded from http://www.cctcc-group.conn/productShow.asp?PicID=967 on Oct. 28, 2013; email received from website owner on Sep. 11, 2013; 2 pages.
Ecolux Doubletree, "LED Integrate Super Flatlight," website description, copyright 2003; downloaded from www.ecolux.com.cn/aspcms/product/2013-4-20/292.html on Aug. 30, 2013; 2 pages.
General Electric Company, "GE Lighting E-Catalogue," product brochure, copyright 1997-2013; http://catalog.gelighting.com/system/indoor-luminaires/recessed/lumination/?remea on Oct. 30, 2013; downloaded from 4 pages.
General Electric Company, "Infusion LED Modules System," website description, copyright 1997-2013; downloaded from http://www.gelighting.com/LightingWeb/emea/products/highlights/infusion-led-module/overview/#3 on Aug. 8, 2013; 1 page.
Heeber Lighting Co., Ltd., "Heeber 600×600mm, 26w LED panel_Heeber," website description, copyright 2005; downloaded from http://www.heeber.com/cp/html/?5.html on Oct. 28, 2013; email received from website owner on Oct. 8, 2013; 3 pages.
Hilton Electrical Co., Ltd., "Hilton LED Products 2013 List," copyright 2009; Product list received by email from website owner on Aug. 13, 2013; 45 pages.
HK Raymates Electronic Co., Ltd, "RM-COB15/30W-W," website description, undated; downloaded from http://www.raymates.com/index.php/product/view/649.html on Oct. 28, 2013; email received from website owner on Sep. 11, 2013; 1 page.
Keyuan Optoelectronic Co., Ltd, "Your Present Position: Display, KYZM12060," website description, undated; downloaded from http://www.zs-keyuan.com/en/displayproduct.html?proID=3068225 on Oct. 28, 2013; email received from website owner on Sep. 2, 2013; 2 pages.
Kindom Opto-Electronic Co., Ltd., "300*300 LED Panel Light (side shine)," website description, copyright 2002-2009; downloaded from http://www.kindomled.com/eng/productsview.asp?id=205 on Oct. 28, 2013; email received from website owner on Sep. 9, 2013; 2 pages.
Lamptop Optoelectronics Tech Co., Ltd. "LED Panel Light-LampTop Optoelectronics Technology Co., LTD," website description, copyright 2009-2013; downloaded from http://www.lamptopled.com/Product/5928161511.html on Sep. 25, 2013; email received from website owner on Sep. 5, 2013; 2 pages.
NGE Technology Limited, "Products Introduction: 300*300mm LED panel light," website description, copyright 2011; downloaded from http://www.nge-led.com/products/NGE-P0303-518W/ on Oct. 28, 2013; email received from website owner on Sep. 17, 2013; 2 pages.
Ningbo KingsLED Electronics Co., LTD, "LED ultrathin downlight & LED panel lighting," website description, undated; brochure and email from website owner sent on Jul. 30, 2013; 4 pages.
Ningbo Yoogir Energy Saving Technology Co., Ltd, "LED PL Lamp, LED PLAC, LED Plug Light, LED PL Light, LED Panel Light, LED Tube," website description, copyright 2003-2013; downloaded from http://www.yoogir.com/HK-PL6060.html on Oct. 24, 2013; email received from website owner on Oct. 17, 2013; 2 pages.
Senseled Technology Co., Limited, "RGB Wall & Ceiling & Dance Floor Panel," website description, undated; downloaded from http://www.senseled.com/product-detail.asp?Product_id=138&Big_Class_id=93; downloaded from website owner on Oct. 29, 2013; email received from website owner on Oct. 10, 2013; 1 page.
Shanghai Goodsun Lighting Co. Ltd, "A. Ultrathin LED Panel Light 600nnm*600mm," website description, copyright 2011-2012; downloaded from http://www.shgoodsun.com/led-panel-light-600-600.htnnl on Oct. 24, 2013; email received from website owner on Oct. 18, 2013; 3 pages.
Shenzhen Aoser Lighting, "SMD2835 led panel light," website description, copyright 2010; downloaded from http://www.aoserled.com/en/Products_detailasp?1_D=326 on Oct. 28, 2013; email received from website owner on Aug. 2, 2013; 2 pages.
Shenzhen BANQ Technology Co., "600*600 front lighting led panel light_Shenzhen Banq Technology CO., LTD," website description, copyright 2013; downloaded from http://www.banqcn.com/product-139.html on Oct. 28, 2013; email received from website owner on Aug. 5, 2013; 6 pages.
Shenzhen Boyao Optoelectronic Technology Co., Ltd, "Shenzhen Boyao Optoelectronic Technology Co., Ltd.—LED High Bay Light, LED Panel Light," website description, copyright 1999-2013, downloaded from boyaotech.en.alibaba.com on Sep. 9, 2013; email received from website owner on Aug. 29, 2013; 3 pages.
Shenzhen Huadian Lighting Co., Ltd, "Professional Manufacturer of LED Tube, LED Panel Light, LED Down Lights, LED Spotlight, etc.," website description, undated; downloaded from http://www.hd-leds.com/products-detail.php?ProId1=81 on Oct. 28, 2013; email received from website owner on Sep. 2, 2013; 2 pages.

(56) References Cited

OTHER PUBLICATIONS

Shenzhen Loevet Lighting Co. Ltd, "Wholesale 600*600mm LED Panel Light Series from Loevet Lighting Co., LTD in China," website description, copyright 2008-2013; downloaded from http://www.lvt-lighting.com/led-panel-light-36W-600×600mm.html on Oct. 28, 2013; email received from website owner on Sep. 6, 2013; 3 pages.
Shenzhen Wak Optoelectronic Co., Ltd, "High Brightness LED Panel Light 600×600mm," website description, undated; downloaded from http://www.wak-led.com/product/showproduct.php?lang=en&id=111 on Oct. 28, 2013; email received from website owner on Aug. 25, 2013; 2 pages.
Tsanli Lighting Co., Limited, "LED Panels-LED Light Panel_LED Panels-LED Light Panel Manufacturers & Suppliers," website description, copyright 2013; downloaded from http://www.sanli-led.com/LED_panel.aspx on Oct. 28, 2013; email received from website owner on Oct. 14, 2013; 8 pages.
Up-shine Lighting Co., Limited, "LED Panel Lamp, Dimmable LED Light, High Lumen LED Lamp, Up-Shine Lighting," website description, undated; downloaded from http://www.upshineled.com/5-led-panel-lamp.html on Oct. 24, 2013; email received from website owner on Oct. 14, 2013; 4 pages.
Westpac LED Lighting, Inc., "LED Panel Lights," website description, copyright 2013; downloaded from http://www.westpacled.com/products/led-panel-lights/ on Oct. 30, 2013; 1 page.
Newsen Electronics Technology Limited, "Newsen Technology, LED Manufacturer, LED Commercial Light, LED Home Light, LED Project Light," website description, copyright 2004-2009; downloaded from http://www.newsenlighting.com/productView.asp?Id=162 on Nov. 4, 2013; email received from website owner on Oct. 29, 2013; 3 pages.
Google Translation of DE 202012103430 U1—downloaded from www.google.com/patents on Oct. 18, 2014; 10 pages.
Google Translation of DE 102010006465A1—downloaded from www.google.com/patents on Nov. 1, 2013; 4 pages.
Google Translation of EP 2270387 B1—downloaded from www.google.com/patents on Nov. 5, 2013; 7 pages.
Alite Co., Ltd., "Products/DLC qualified LED panel_Alite co., Ltd-Led tube lighting, Led bulb, Led spotlights lights, Led panel-china Led Lighting, China Led manufacturer," website description, copyright 2008-2013; downloaded from http://www.aliteled.com/a/Products/dlcledpanel/ on Jan. 2, 2014; 2 pages.
Asia-Boslin Optoelectronics Sci & Tech Group Co., LTD, "600×600mm 40W 5630 Samsung Ultra-Thin LED Panel Light", website description, copyright 2014; downloaded from www.simaoled.com/english/pro_show.asp?mid=2&name=40W%20OLED%20Panel%20Light&pc1_id=13&p_id=741&p_name=40W%20OLED%20Panel%20LighthE123 on Apr. 15, 2014; 7 pages.
Ecother Technology Limited, "LED Panel Light ET-PL-S6060-36W," website description, copyright 2007-2012; downloaded from http://ecother.com/showproducts.php?id=41 on Apr. 1, 2014; 2 pages.
Emerge DDP Engineered LED Solutions, "ProductsEmerge," website description, copyright 2014; downloaded from www.emergelighting.com/products/ on Feb. 19, 2014; 1 page.
HK Kstar Electronic Co., Ltd. "RGB 600*600 LED Panel Light," website description, undated; downloaded from http://www.kstar-lighting.com/product.asp?id=1675 on Jan. 2, 2014; email received from website owner on Sep. 25, 2013; 3 pages.
International Application No. PCT/US12/38315 International Preliminary Report On Patentability and Written Opinion of the International Searching Authority dated Nov. 19, 2013, Attached to International Publication No. WO2012/158894, Nov. 22, 2012; 12 pages.
International Application No. PCT/US12/38338 International Preliminary Report On Patentability and Written Opinion of the International Searching Authority dated Nov. 19, 2013, Attached to International Publication No. WO2012/158908, Nov. 22, 2012; 11 pages.

Kili-LED Lighting Limited, "LED Panel Light," website description, undated; downloaded from http://www.kili-led.com/?producten/Product57/ on Apr. 1, 2014; email received from website owner on Mar. 24, 2014; 3 pages.
Light Green International Co., Ltd., "Light Green International Co., Ltd. The Largest Manufacturer of LED Panel Lights in China," website description, copyright 2010-2012; downloaded from http://light-green.cn/english/Product_Catalog_03_01.aspx?id=65 on Apr. 16, 2014; email received from website owner on Apr. 2, 2014; 2 pages.
OPUS Technology Development Co., Ltd., "600×1200mm LED Panel Light SOW," website description, undated; downloaded from http://www.opus-led.com/600×1200mnn-LED-Panel-Light-SOW.html on Mar. 12, 2014; email received from website owner on Mar. 10, 2014; 3 pages.
QuarkStar, "Light Shaping: An Innovative New Approach for SSL Luminaires," presentation from Strategies in Light conference on Feb. 25-27, 2014, undated; 32 pages.
Shenzhen CREP Optoelectronics Co., Ltd., "CREP Optoelectronic Co., Ltd.," website description, copyright 2010-2011; downloaded from http://www.crep-led.com/EN/products.aspx on Nov. 16, 2013; email received from website owner on Nov. 13, 2013; 2 pages.
Shenzhen King Star Opto-Electronic Co., LTD, "China Ultra-thin Economical LED Panel Light supplier," website description, copyright 2005-2013; downloaded from http://www.ks-light.com/china-id293.html on Apr. 16, 2014; email received from website owner on Apr. 1, 2014; 5 pages.
Shenzhen Magreen Group Co., Ltd., "Shenzhen Magreen Lighting Technology Co., Limited," email attachment received from website owner on Apr. 1, 2014; undated; 3 pages.
Shenzhen Man Jia Technology Limited, "15w square led panel light with glass edge," website description, copyright 2011-2012; downloaded from http://www.manjia-lighting.com/detail/1Swsquareledpanel-lightwithgl_assedge.html#1# on Nov. 16, 2013; email received from website owner on Nov. 16, 2013; 7 pages.
Shenzhen Ming Light Co., Ltd, "Minglight Manufacturing Co; LtthLED Panel LighbLED Panel Light 600×600 1S&20&39W, IP54," website description, copyright 2011; downloaded from http://www.minglight.com.cn/LED%20Panel%20Light%20600×600%20%201S&20&39W,°/0201P54-pii-4S.htnnl on Nov. 16, 2013; email received from website owner on Nov. 14, 2013; 4 pages.
Shenzhen MJ International, "Energy Light Index," website description, undated; downloaded from http://www.energyledlight.com/index.asp on Apr. 15, 2014; email received from website owner on Feb. 17, 2014; 1 page.
Shenzhen Ruidisi Lighting Co., Ltd, "RDS-6060-Ruidisi Lighting (HK) Co., Limited," website description, copyright 2013; downloaded from http://www.rds-led.com/Products/Candle_Light_Series/Square_panel_light/rds11.html on Nov. 16, 2013; 2 pages.
Shine Technology Ltd, "Led light-led panel light, led bulb and waterproof led power supply manufacturer in China," website description, copyright 1999-2013, downloaded from http://shine-technology.en.alibaba.com on Dec. 23, 2013; email received from website owner on Nov. 25, 2013; 3 pages.
Star Light Technology Group (China) Limited, "LED Panel light 1200*600 (Full color)—LED Panel Light—China—STAR," website description, copyright 1995-2013; downloaded from www.starlight-led.com/sdp/865240/4/pd-4460524/6793633-1955803/LED_Panel_light_600_600_Full_colors.html#normal_img on Dec. 23, 2013; 2 pages.
Tonya Lighting Technology Co., Ltd., "Tonya Lighting Technology Co., Ltd," website description, copyright 2009; downloaded from http://www.tonyalight.com/Defaultaspx?PN:prd_view&ps:&pID=75466 on Nov. 15, 2013; email received from website owner on Nov. 15, 2013; 2 pages.
West Deer Technology Co., Limited, "Product Show," website description, copyright 2013; downloaded from http://wdeer-led.com/html/prsO/t287-310/c556.html on Apr. 15, 2014; email received from website owner on Mar. 3, 2014; 2 pages.
Patent Cooperation Treaty, "Invitation To Pay Additional Fees And, Where Applicable, Protest Fee", partial international search report for international application No. PCT/US2014/033352, dated Aug. 11, 2014; 6 pages.

(56) References Cited

OTHER PUBLICATIONS

Google Translation of DE 102010008359 A1—downloaded from www.google.com/patents on Oct. 17, 2013; 16 pages.
Google Translation of EP 1361391 A2—downloaded from www.google.com/patents on Oct. 17, 2013; 6 pages.
Google Translation of EP 1059484 A1—downloaded from www.google.com/patents on Oct. 17, 2013; 17 pages.
Patent Cooperation Treaty, "Notification of Transmittal of International Search Report and the Written Opinion of the International Searching Authority", international search report for international application No. PCT/US2014/033953, dated Aug. 13, 2014; 12 pages.
Thomson Scientific translation of WO 2009017117 A1—enclosed with international search report for international application No. PCT/US2014/033953, dated Aug. 13, 2014; 24 pages.
Google Translation of WO 2012/113005 A1—downloaded from www.google.com/patents on Oct. 17, 2013; 5 pages.
Patent Cooperation Treaty, "International Preliminary Report on Patentability", written opinion of the international searching authority for international application No. PCT/US2012/038315, dated Nov. 19, 2013; 12 pages.
Patent Cooperation Treaty, "International Preliminary Report on Patentability", written opinion of the international searching authority for international application No. PCT/US2012/038338, dated Nov. 19, 2013; 11 pages.
LEDCONN Corp., exhibitor at Lightfair 2014 Jun. 1-5, 2014, "iFITTM LED Light Panel", website copyright 2014; downloaded from http://ledconn.com/index.php/products/ifit-led-light-panel on Oct. 20, 2014; 5 pages.
The Aurora Group, exhibitor at Lightfair 2014 Jun. 1-5, 2014, VerseTile LED panels, website copyright 1999-2014, downloaded from http://gb.auroralighting.com/Products/Indoor-Luminaires/LED-Flat-Panels on Oct. 20, 2014, 4 pages.
Elumina Technology Inc., exhibitor at Lightfair 2014 Jun. 1-5, 2014, LED Panel Light G3, website copyright 2013, downloaded from http://www.eluminatech.com/pro/list2.php?cid=30&f=30&pa=30 on Oct. 20, 2014, 2 pages.
BrightView Technologies, exhibitor at Lightfair 2014 Jun. 1-5, 2014, Light Management/Angle Management products, website copyright 2014, downloaded from http://www.brightviewtechnologies.com/products/light-management/lightmanagementipage.aspx?id=1129 on Oct. 20, 2014, 2 pages.
Pinnacle Architectural Lighting, exhibitor at Lightfair 2014 Jun. 1-5, 2014, brochure for LINERO LED lighting product line, brochure downloaded from http://www.pinnacle-ltg.com/downloads/linero/Linero_Brochure.pdf on Oct. 20, 2014, 20 pages.
TCL LED USA, exhibitor at Lightfair 2014 Jun. 1-5, 2014, LED Panel Light, website copyright 2013, downloaded from http://tclledusa.com/products/led-panel-light/ on Oct. 20, 2014, 3 pages.
Cougar LED Lighting, exhibitor at Lightfair 2014 Jun. 1-5, 2014, 2014, Cougar LED lighting catalog, catalog downloaded from http://www.cougar-lighting.de/en/downloads-english/catalogues.html on Oct. 20, 2014, 20 pages.
European Patent Office, "Communication Pursuant to Article 94(3) EPC", Examination report for European patent application 12726949.6, dated Feb. 2, 2015; 2 pages.
European Patent Office, Annex to the Communication Pursuant to Article 94(3) EPC, Examination report for European patent application 12726949.6, dated Sep. 17, 2015; 5 pages.
Non-Final Office Action issued in U.S. Appl. No. 13/473,918 dated Jan. 6, 2014, 19 pages.
Final Office Action issued in U.S. Appl. No. 13/473,918 dated Jun. 4, 2014, 16 pages.
Notice of Allowance issued in U.S. Appl. No. 13/473,918 dated Aug. 11, 2014.
Notice of the Reason for Refusal dated Mar. 15, 2016 corresponding to Japanese Patent Application No. 2014-511528, 7 pages.
English Translation of the Notice of the Reason for Refusal dated Mar. 15, 2016 corresponding to Japanese Patent Application No. 2014-511528, 6 pages.
Computer generated English translation of Registered Utility Model No. 3140783, transcribed from the Japan Platform of Patent Information, https://www.jplatpatinpit.go.jp/web/all/top/BTnnTopEnglishPage, on Apr. 22, 2016, 11 pages.
Computer generated English translation of Patent Application Laid-open No. 2011-138731, transcribed from the Japan Platform of Patent Information, https://www.jplatpatinpit.go.jp/web/all/top/BTnnTopEnglishPage, on Apr. 22, 2016, 32 pages.
Non-Final Office Action dated Apr. 26, 2016 corresponding to U.S. Appl. No. 14/480,262, 18 pages.
Applicant Initiated Interview Summary dated Jun. 16, 2016 corresponding to U.S. Appl. No. 14/480,262, 4 pages.
Notice of Allowance dated Jul. 29, 2016 corresponding to U.S. Appl. No. 14/480,262, 17 pages.
Non-Final Office Action dated May 4, 2016 corresponding to U.S. Appl. No. 14/554,919, 69 pages.
Non-Final Office Action dated Apr. 24, 2015 corresponding to U.S. Appl. No. 14/554,919, 18 pages.
Final Office Action dated Oct. 7, 2015 corresponding to U.S. Appl. No. 14/554,919, 36 pages.
Power Integrations—DER-384—Oct. 2013 https://led-driver.power.com/sites/default/files/PDFFiles/der384.pdf?Adsource=Aden_EEW%3felqTrack=true%futm_source=EEWeb&utm_medium=TechCommunity&utm_term=2014&utm_content=Content&&utm_campaign=Powerintegrations, 41 pages.
Advisory Action dated Jan. 25, 2016 corresponding to U.S. Appl. No. 14/554,919, 4 pages.
Interview Summary dated Apr. 5, 2016 corresponding to U.S. Appl. No. 14/554,919, 12 pages.
Non-Final Office Action dated Apr. 7, 2016 corresponding to U.S. Appl. No. 14/246,823, 11 pages.
Applicant Initiated Interview Summary dated Jul. 8, 2016 corresponding to U.S. Appl. No. 14/246,823, 3 pages.
Non-Final Office Action dated Jan. 22, 2016 corresponding to U.S. Appl. No. 14/248,197, 10 pages.
Non-Final Office Action dated Sep. 1, 2015 corresponding to U.S. Appl. No. 14/254,822, 8 pages.
Final Office Action dated Mar. 9, 2016 corresponding to U.S. Appl. No. 14/254,822, 11 pages.
Notice of Allowance and Fee(s) Due and Examiner Initiated Interview Summary dated Apr. 5, 2016 corresponding to U.S. Appl. No. 14/618,665, 14 pages.
Non-Final Office Action dated Mar. 30, 2015 corresponding to U.S. Appl. No. 14/618,665, 9 pages.
Non-Final Office Action dated Sep. 15, 2015 corresponding to U.S. Appl. No. 14/618,665, 17 pages.
Applicant-Initiated Interview Summary dated Mar. 18, 2016 corresponding to U.S. Appl. No. 14/480,772, 3 pages.
Non-Final Office Action dated Dec. 18, 2015 corresponding to U.S. Appl. No. 14/480,772, 16 pages.
Final Office Action dated Jul. 14, 2016 corresponding to U.S. Appl. No. 14/480,772, 17 pages.
Examination Search Report dated Dec. 11, 2015 corresponding to Canadian Patent Application No. 2,835,213, 3 pages.
Canadian Intellectual Property Office, Examiner's Report under Subsection 30(2) of the Patent Rules, Examination Report for Canadian patent application 2,835,213, dated Apr. 22, 2015, 4 pages.
Notice of the Reason for Refusal dated Sep. 21, 2015 corresponding to Chinese Patent Application No. 201280024002.3, 10 pages.
English Translation of the Notice of the Reason for Refusal dated Sep. 21, 2015 corresponding to Chinese Patent Application No. 201280024002.3, 8 pages.
Notice of the Reason for Refusal dated Oct. 30, 2015 corresponding to Chinese Patent Application No. 201280023544.9, 6 pages.
English Translation of the Notice of the Reason for Refusal dated Oct. 30, 2015 corresponding to Chinese Patent Application No. 201280023544.9, 9 pages.
Non-Final Office Action/Requirement for Restriction/Election issued in U.S. Appl. No. 13/483,918 dated Nov. 14, 2012, 6 pages.
Non-Final Office Action issued in U.S. Appl. No. 13/483,918 dated Apr. 23, 2013, 9 pages.

(56) References Cited

OTHER PUBLICATIONS

Notice of Allowance issued in U.S. Appl. No. 13/483,918 dated Nov. 22, 2013, 9 pages.
Non-Final Office Action issued in U.S. Appl. No. 13/473,929 dated Apr. 10, 2015, 26 pages.
Final Office Action issued in U.S. Appl. No. 13/473,929 dated Oct. 22, 2015, 33 pages.
Advisory Action issued in U.S. Appl. No. 13/473,929 dated Mar. 30, 2016, 10 pages.
"Lamp Size and Comparison Features." Retrieved on Nov. 9, 2015, from http://www.grainger.com/tps/lighting_lamp_size_and_feature_comparison_pdf, 1 page.
Wilson, R., "Power Integrations LED driver is 88% efficient for 100W bulb replacement," ElectronicsWeekly.com, Sep. 2015, retrieved from the Internet: http://www.electronicsweekly.com/blost/led-luminaries/power-integrations-led-driver-is-889-efficient-for_100w-bulb-replacement-2012-09/, retrieved on Dec. 7, 2015, 3 pages.
Think Lumens, Not Watts: Buying Light bulbs in the 21st Century, EarthLED, retrieved from the Internet: https://www.earthled.com/pages/lumens-watts-and-buying-lightbulbs-in-the-21st-century, retrieved on Dec. 7, 2015, 5 pages.
Lumination LED Luminaires—Recessed LED Troffer—ET Series, GE imagination at work, retrieved from the Internet: www.gelighting.com/LightingWeb/na/solutions/indorr-lighting/recessed/lumination-et-series.jsp, retrieved on Dec. 7, 2015, 8 pages.
Google Translation of CN 201628158—downloaded from www.google.com/patents on Sep. 22, 2015; 3 pages.
LEDsupply, "Understanding LED Drivers and How To Choose the Right One," undated, downloaded from http://www.ledsupply.com/blog/understanding-led-drivers/ on Jun. 12, 2015, 5 pages.
Notice of Allowance issued in U.S. Appl. No. 14/497,943 dated Jun. 22, 2016, 13 pages.
Non Final Office Action in U.S. Appl. No. 14/497,943 dated Mar. 27, 2015, 9 pages.
Non Final Office Action in U.S. Appl. No. 14/497,943 dated Aug. 28, 2015, 14 pages.
Final Office Action in U.S. Appl. No. 14/497,943 dated Jun. 24, 2015, 8 pages.
List of References in U.S. Appl. No. 14/497,943 dated Jul. 1, 2016.
Examiner's Amendment and List of References in U.S. Appl. No. 14/497,943 dated Jul. 20, 2016, 3 pages.
Power integrations DER-323 18 W A19 LED Driver Using LNK460VG, Figure 1 and figure 2, p. 4 http://www.power.com/sites/default/files/PDFFiles/der323.pdf Jun. 21, 2012, 39 pages.
Non-Final Office Action dated May 26, 2016 corresponding to U.S. Appl. No. 14/517,676, 11 pages.
Notice of Allowance issued in U.S. Appl. No. 15/092,186 dated Jul. 18, 2016, 9 pages.
Notice of Allowance issued in U.S. Appl. No. 15/158,353 dated Jul. 5, 2016, 10 pages.
Applicant Initiated Interview Summary dated Aug. 18, 2016 corresponding to U.S. Appl. No. 14/517,676, 9 pages.
Shenzhen Bonld Electronics Co., LTD., Quotation of DLC LED Panel, New Price List of DLC Panel-Bonld, received from the vendor on Nov. 17, 2015, 1 page.
Shenzhen Huadian Lighting Co., Ltd, "Top 2 Bestseller of LED Panel Light in China", downloaded from http://www.hd-leds.com/products.php. On Aug. 17, 2016; similar brochure distributed during Hong Kong International Lighting Fair, Autumn Edition, Oct. 27-30, 2015, 4 pages.
Syhdee, "LED Panel Light", Product Specification of Flat Panel of Shenzhen Syhdee Co., Ltd., product specification was received by email from Shenzhen Syhdee Co., Ltd. on Aug. 3, 2016.
Canadian Intellectual Property Office, Examiner's Report under Subsection 30(2) of the Patent Rules, Examination Report for Canadian patent application 2,835,213, dated Jun. 30, 2016, 4 pages.

Notice of Allowance issued in U.S. Appl. No. 14/254,822 dated Aug. 26, 2016, 35 pages.
Applicant Initiated Interview Summary issued in U.S. Appl. No. 14/554,919, dated Sep. 12, 2016, 12 pages.
Notice of Allowance issued in U.S. Appl. No. 14/246,823 dated Sep. 16, 2016, 18 pages.
Final Office Action issued in U.S. Appl. No. 14/554,919 dated Oct. 3, 2016, 31 pages.
Notice of Allowance dated Sep. 16, 2016 2016 issued in U.S. Appl. No. 14/246,823, 18 pages.
Supplemental Notice of Allowance dated Oct. 23, 2016 issued in U.S. Appl. No. 14/246,823.
Notice of Allowance issued in U.S. Appl. No. 14/517,676 dated Nov. 1, 2016, 28 pages.
Notice of Allowance issued in U.S. Appl. No. 15/241,744 dated Oct. 24, 2016, 24 pages.
Official Letter dated Sep. 6, 2016 for Taiwan Patent Application No. 101117573, "Flat Panel Lighting Device and Driving Circuitry", 4 pages.
Partial translation of Official Letter dated Sep. 6, 2016 for Taiwan Patent Application No. 101117573, "Flat Panel Lighting Device and Driving Circuitry", 1 page.
Search Report dated Sep. 6, 2016 for Taiwan Patent Application No. 101117573, "Flat Panel Lighting Device and Driving Circuitry", 1 page.
Information Disclosure Statement filed in U.S. Appl. No. 15/269,694 dated Sep. 19, 2016, 17 pages.
Transmittal Letter for Information Disclosure Statement filed in U.S. Appl. No. 15/269,694 dated Sep. 19, 2016, 2 pages.
European Patent Office Action dated Nov. 25, 2016 for EP Application No. 12726949.6, "Flat Panel Lighting Device and Driving Circuitry", 6 pages.
Notice of Allowance issued in U.S. Appl. No. 14/700,671 dated Dec. 6, 2016, 33 pages.
Japan Patent Office Examination Action dated Dec. 13, 2016 for JP Application No. 2014-511528, "Flat Panel Lighting Device and Driving Circuitry", 2 pages.
English translation of Japan Patent Office Examination Action dated Dec. 13, 2016 for JP Application No. 2014-511528, "Flat Panel Lighting Device and Driving Circuitry", 1 page.
Notice of Allowance issued in U.S. Appl. No. 15/209,142 dated Jan. 27, 2017, 53 pages.
EPO Patent Translate translation of German Laid-Open Patent Application DE102006001981A1, submitted with Request for Reexamination of U.S. Pat. Nos. 9,423,113; 9,335,036; and 9,923,487.
EPO Patent Translate translation of German Laid-Open Patent Application DE102008003703A1, submitted with Request for Reexamination of U.S. Pat. Nos. 9,423,113; 9,335,036; and 9,923,487.
EPO Patent Translate translation of German Laid-Open Patent Application DE102009021846A1, submitted with Request for Reexamination of U.S. Pat. Nos. 9,423,113; 9,335,036; and 9,923,487.
Request for ex parte Reexamination of U.S. Pat. No. 9,335,036.
Order granting ex parte Reexamination of U.S. Pat. No. 9,335,036, U.S. Appl. No. 90/014,104.
Request for ex parte Reexamination of U.S. Pat. No. 9,447,954.
Order granting ex parte Reexamination of U.S. Pat. No. 9,447,954, U.S. Appl. No. 90/014,105.
Request for ex parte Reexamination of U.S. Pat. No. 9,423,113.
Order granting ex parte Reexamination of U.S. Pat. No. 9,423,113, U.S. Appl. No. 90/014,106.
Request for ex parte Reexamination of U.S. Pat. No. 9,523,487.
Order granting ex parte Reexamination of U.S. Pat. No. 9,523,487, U.S. Appl. No. 90/014,107.
Power Integrations, Inc., Design Example Report DER-256, cited as prior art reference in Ex Parte Reexamination Requests for U.S. Pat. Nos. 9,423,113; 9,335,036; and 9,923,487.

\* cited by examiner

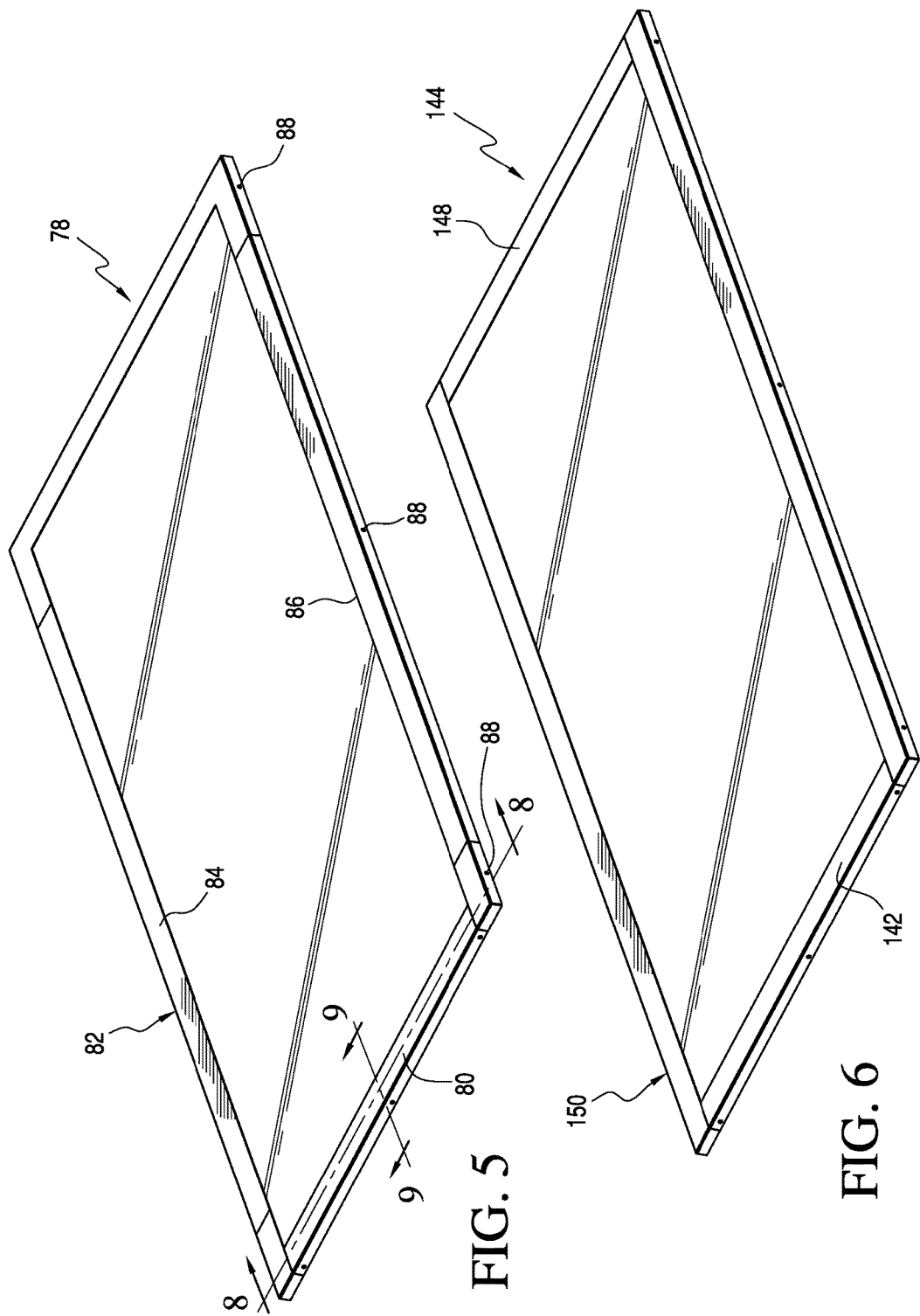

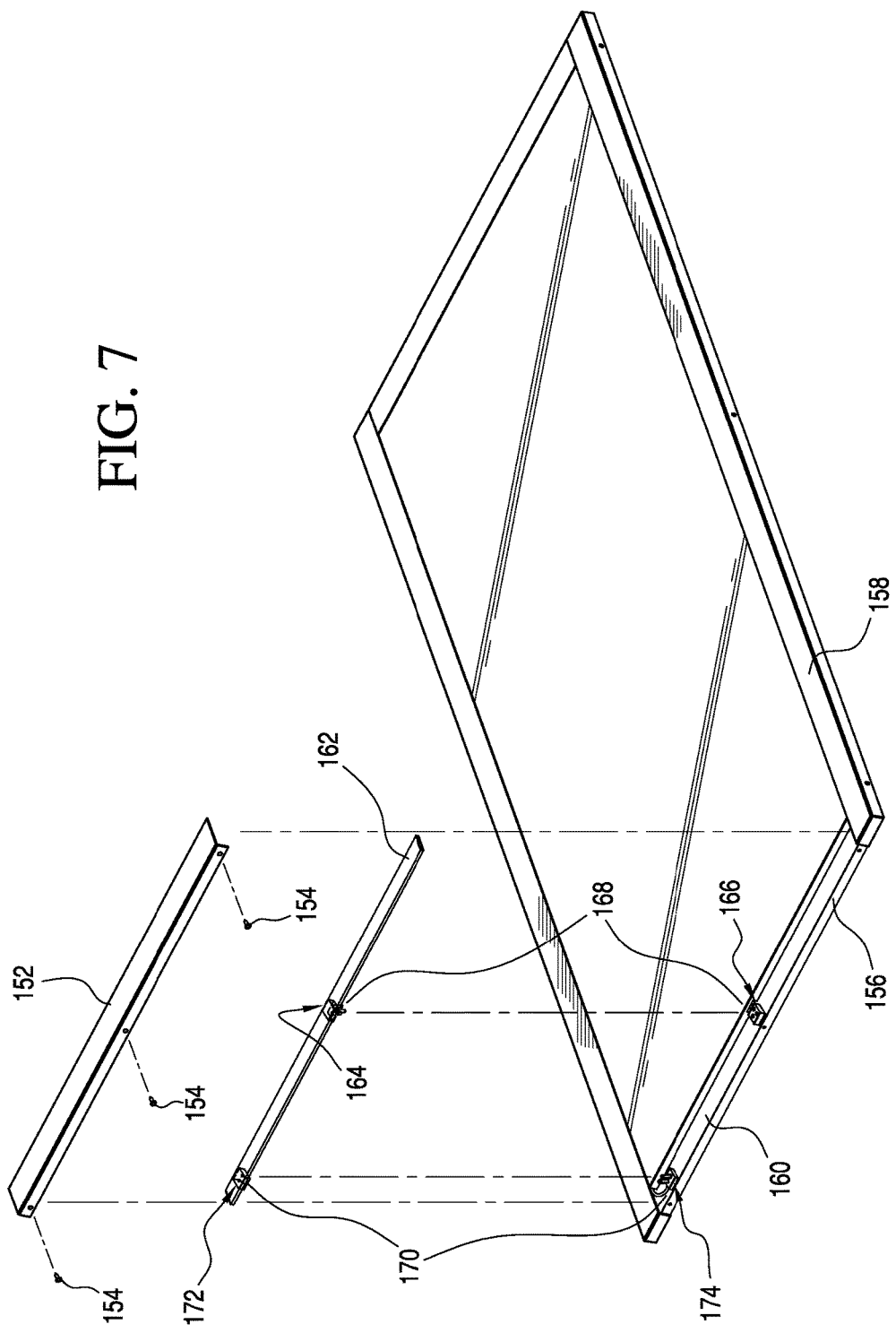

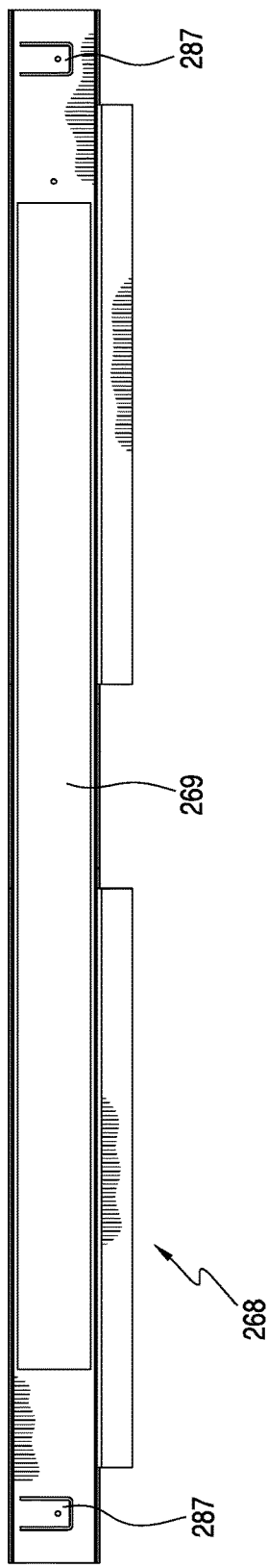
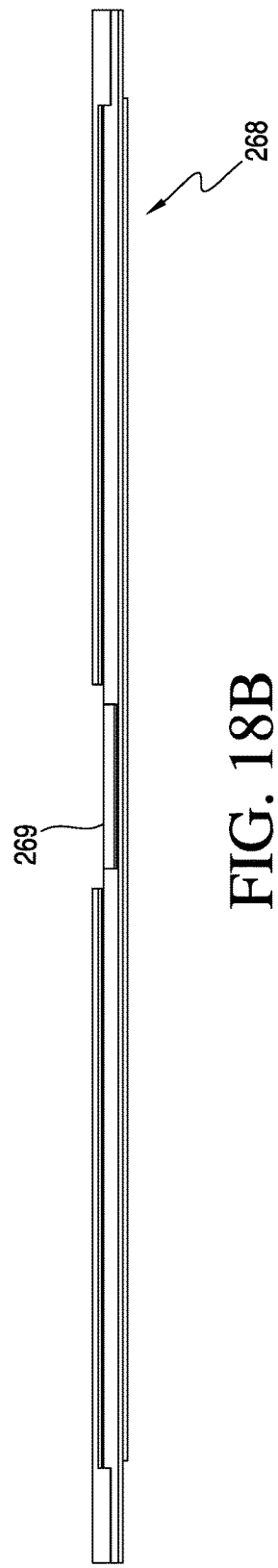
FIG. 18A
FIG. 18B

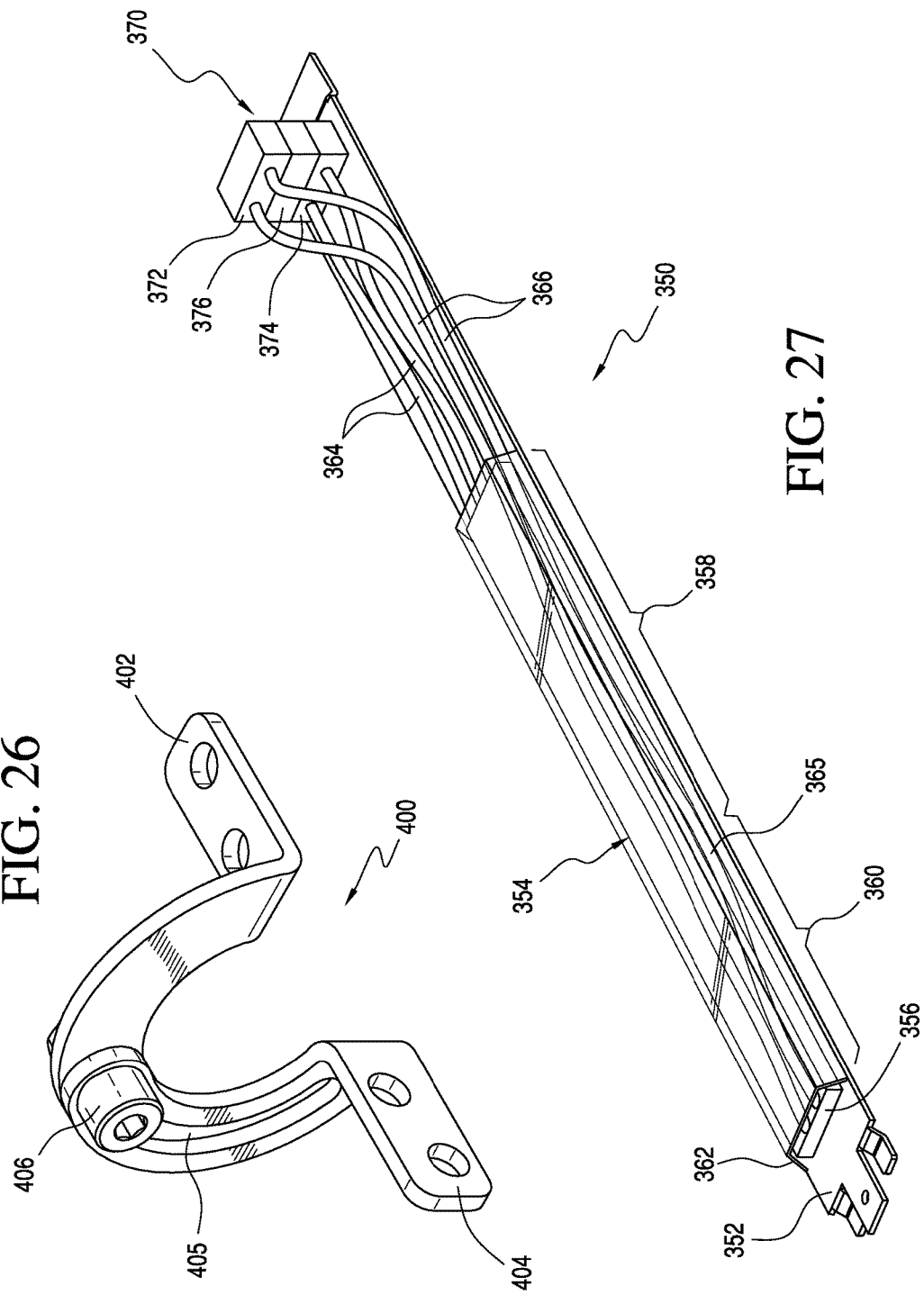

FIELD-SERVICEABLE FLAT PANEL LIGHTING DEVICE

CROSS REFERENCE TO RELATED APPLICATIONS

This application is a continuation of U.S. Ser. No. 14/517,676, entitled "FIELD-SERVICEABLE FLAT PANEL LIGHTING DEVICE", filed Oct. 17, 2014, which is a continuation-in-part of U.S. Ser. No. 14/248,197, entitled "FIELD-SERVICEABLE FLAT PANEL LIGHTING DEVICE", filed Apr. 8, 2014. The present application claims benefit of U.S. Provisional Application No. 61/812,973 filed Apr. 17, 2013, entitled "LIGHTING ASSEMBLY"; and U.S. Provisional Application No. 61/917,102 filed Dec. 17, 2013, entitled "FIELD-SERVICEABLE FLAT PANEL LIGHTING DEVICE"; the entire contents of which are hereby incorporated by reference.

INCORPORATION BY REFERENCE

The present application incorporates by reference the following patent applications in their entireties:
U.S. Pat. Pub. No. 2013-0044512, entitled "FLAT PANEL LIGHTING DEVICE AND RETROFIT KIT," published Feb. 21, 2013 (Ser. No. 13/473,918, filed May 17, 2012); U.S. Pat. Pub. No. 2012-0320627, entitled "FLAT PANEL LIGHTING DEVICE AND DRIVING CIRCUITRY," published Dec. 20, 2012 (Ser. No. 13/473,929, filed May 17, 2012); U.S. Pat. App. No. 61/812,973, entitled "LIGHTING ASSEMBLY" (filed Apr. 17, 2013); U.S. Provisional Application No. 61/917,102, filed Dec. 17, 2013, entitled "FIELD-SERVICEABLE FLAT PANEL LIGHTING DEVICE"; and, U.S. patent application Ser. No. 14/246,823, filed Apr. 7, 2014, entitled "LIGHTING ASSEMBLY".

BACKGROUND OF THE INVENTION

1. Field of the Invention

The present invention relates generally to solid state lighting, such as light emitting diode (LED) lighting, and more particularly to an LED light fixture and a field-replaceable module therefor.

2. Description of the Related Art

LEDs have advantages over alternative lighting technologies including the robustness and reliability inherent in solid state devices, the lack of toxic chemicals that can be released during accidental breakage or disposal, instant-on capabilities, dimmability, and the lack of audible noise. The cost of LED luminaires is being reduced with the continuous development of the LED illuminating technology. LED light sources can be adapted to a wide range of lighting applications traditionally served by conventional technologies, such as incandescent and fluorescent illumination, and such LED light sources can enjoy significantly longer operating lives than light fixtures based upon these conventional technologies.

Over the lifetime of a lighting system, for example a commercial lighting system, the expenditures associated with operating and maintaining the system can be significant. As lighting fixtures age and deteriorate, the light-emitting ability degrades and the light output per unit of consumed electrical energy is significantly reduced. In many applications it is desirable to utilize lighting systems which facilitate maintenance of installed light fixtures, e.g., to replace certain components and extend operating life. It is particularly desirable in such applications to provide lighting fixtures that permit post-installation replacement of key components that may fail or deteriorate before the remainder of the light fixture, without requiring removal of the entire light fixture. Such components are sometimes called "field replaceable" components. The improved LED light fixtures of the present invention address these needs.

SUMMARY OF THE INVENTION

One aspect of the disclosed technology relates to a light fixture comprising (a) a light emitting panel assembly comprising a frame and a substantially flat light emitting diode (LED) panel disposed within the frame, said substantially flat light emitting diode (LED) panel including an optically transmissive panel, and an array of light emitting diodes (LEDs) disposed adjacent an edge of the optically transmissive panel and disposed adjacent a first edge of the frame; (b) a power circuitry module disposed within the frame adjacent a second edge of the frame and releasably attachable to the light emitting panel assembly, said power circuitry module including a power circuit; (c) a decouplable source electrical connector that electrically couples the power circuit to an AC power supply external to the light fixture, wherein the power circuit converts AC power to DC power to drive the array of light emitting diodes (LEDs), and wherein the decouplable source electrical connector is electrically coupled to the AC power supply through a luminaire disconnect; and (d) a decouplable driver electrical connector that electrically couples the power circuit to the array of light emitting diodes (LEDs); wherein the substantially flat light emitting diode (LED) panel and the power circuitry module are disposed side-by-side within the frame.

One aspect of the disclosed technology relates to a light fixture comprising: (a) a light emitting panel assembly comprising a frame and a substantially flat light emitting diode (LED) panel disposed within the frame, said substantially flat light emitting diode (LED) panel including an optically transmissive panel, and an array of light emitting diodes (LEDs) disposed adjacent the optically transmissive panel; (b) a power circuitry module disposed within the frame adjacent an edge of the frame and releasably attachable to the light emitting panel assembly, said power circuitry module including a power circuit, wherein the substantially flat light emitting diode (LED) panel and the power circuitry module are disposed side-by-side within the frame; (c) a decouplable source electrical connector that electrically couples the power circuit to an AC power supply external to the light fixture, wherein the power circuit converts AC power to DC power to drive the array of light emitting diodes (LEDs); and (d) a decouplable driver electrical connector that electrically couples the power circuit to the array of light emitting diodes (LEDs); wherein the frame defines an aperture adjacent the edge of the frame configured to solely access the power circuitry module, and wherein the light fixture includes a cover member that is releasably attachable to the frame and is configured to cover the aperture.

One aspect of the disclosed technology relates to a light fixture comprising: (a) a light emitting panel assembly comprising a frame and a substantially flat light emitting diode (LED) panel disposed within the frame, said substantially flat light emitting diode (LED) panel including an optically transmissive panel, and an array of light emitting diodes (LEDs) disposed adjacent an edge of the optically transmissive panel and disposed adjacent a first edge of the frame; (b) a power circuitry module disposed within the frame adjacent a second edge of the frame and releasably attachable to the light emitting panel assembly, said power circuitry module including a power circuit, wherein the power circuit comprises a printed circuit board having a length and a width, wherein a length-to-width ratio of the printed circuit board is at least five-to-one; (c) a decouplable source electrical connector that electrically couples the power circuit to an AC power supply external to the light fixture, wherein the power circuit converts AC power to DC power to drive the array of light emitting diodes (LEDs); and (d) a decouplable driver electrical connector that electrically couples the power circuit to the array of light emitting diodes (LEDs); wherein the frame has a thickness less than about 1.0 inch, and the substantially flat light emitting diode (LED) panel and the power circuitry module are disposed side-by-side within the frame In one embodiment, the present invention is embodied as a light fixture including a light emitting panel assembly with a frame and a substantially flat light emitting diode (LED) panel disposed within the frame, the substantially flat light emitting diode (LED) panel including an array of light emitting diodes (LEDs). A power circuitry module is disposed within the frame adjacent an edge of the frame and is releasably attachable to the light emitting panel assembly, the power circuitry module including a power circuit. A decouplable source electrical connector electrically couples the power circuit to a power supply external to the light fixture, and a decouplable driver electrical connector electrically couples the power circuit to the array of light emitting diodes (LEDs).

In one aspect of the light fixture, the power supply external to the light fixture is an AC power supply, and the power circuit converts AC power to DC power to drive the array of light emitting diodes (LEDs). The power circuitry module includes a first portion of the decouplable source electrical connector electrically coupled to the power circuit, and a second portion of the decouplable source electrical connector electrically coupled to the AC power supply. The decouplable source electrical connector may be electrically coupled to the AC power supply through a luminaire disconnect.

In another aspect of the light fixture, the power circuitry module is configured to be detached and separated from the light emitting panel assembly, and at least one of the decouplable source electrical connector and the decouplable driver electrical connector is configured to be decoupled as the power circuitry module is detached and separated from the light emitting panel assembly.

In a further aspect of the light fixture, the frame defines an aperture adjacent the edge of the frame configured to receive the power circuitry module. The power circuitry module includes a cover member that is releasably attachable to the frame and is configured to cover the aperture.

In yet another aspect of the light fixture, the decouplable source electrical connector, and the decouplable driver electrical connector are disposed within a channel defined by the frame adjacent the edge of the frame.

In a still further aspect of the light fixture, the power circuit comprises a printed circuit board having a length and a width, wherein a length-to-width ratio of the printed circuit board is at least five-to-one. In this aspect of the light fixture, the length-to-width ratio of the printed circuit board may be at least ten-to-one. The width of the printed circuit board may be less than about 0.5 inch.

In another aspect of the light fixture, the frame has a thickness less than about 1.0 inch.

In yet another aspect of the light fixture, an LEDs module is disposed within the frame and contains the array of light emitting diodes (LEDs), the LEDs module being releasably attachable to the frame.

In still another aspect of the light fixture, the substantially flat light emitting diode (LED) panel includes an optically transmissive panel, and the array of light emitting diodes (LEDs) is disposed adjacent the optically transmissive panel and adjacent a second edge of the frame.

In a further aspect of the light fixture, the substantially flat light emitting diode (LED) panel and the power circuitry module are disposed side-by-side within the frame.

In another embodiment, the invention is embodied as a light fixture including a frame having a thickness of less than about 1.0 inches, and a substantially flat light emitting diode (LED) panel disposed within the frame, the substantially flat light emitting diode (LED) panel including an array of light emitting diodes (LEDs). A power circuitry module is disposed within the frame and is releasably attachable to the frame, the power circuitry module including a power circuit. The frame defines an aperture configured to receive the power circuitry module. A decouplable source electrical connector electrically couples the power circuit to a power supply external to the light fixture, and a decouplable driver electrical connector electrically couples the power circuit to the array of light emitting diodes (LEDs).

In one aspect of the light fixture, the power supply external to the light fixture is an AC power supply, and the power circuit converts AC power to DC power to drive the array of light emitting diodes (LEDs).

In another aspect of the light fixture, the power circuitry module includes a cover member that is releasably attachable to the frame and is configured to cover the aperture. The cover member includes a cover plate having an inner surface, and the power circuit is secured to the inner surface of the cover plate.

In a further aspect of the light fixture, the decouplable driver electrical connector includes a first portion of the driver electrical connector secured to the inner surface of the cover plate, and the decouplable source electrical connector includes a first portion of the source electrical connector secured to the inner surface of the cover plate. The first portion of the driver electrical connector, and the first portion of the decouplable source electrical connector, are secured to the inner surface of the cover plate in a unitary electrical connector assembly.

In still another aspect of the light fixture, the power circuit has a length and a width, wherein a length-to-width ratio of the power circuit is at least five-to-one. The width of the power circuit may be less than about 0.5 inch.

In a further aspect of the light fixture, the frame defines the aperture adjacent an edge of the frame and the frame defines a channel adjacent the edge of the frame, wherein the aperture provides access to the channel and the channel houses the power circuitry module.

In a further embodiment, the invention is embodied as a light fixture including a substantially flat light emitting diode (LED) panel that emits light at a light emission area, and a frame including a front frame and a base frame. The front frame surrounds the light emission area of the substantially flat light emitting diode (LED) panel. A power circuitry module is disposed within the frame and is releasably attachable to the frame. The power circuitry module includes a power circuit and electrical connectors that electrically couple the power circuit to a power supply external to the light fixture. The front frame includes an outer bezel fixed to the base frame, and an inner bezel that is movable relative to the outer bezel to provide access to the power circuitry module.

In one aspect of the light fixture, the inner bezel is coupled to the outer bezel by a hinge assembly, and the inner bezel can pivot relative to the outer bezel at said hinge assembly.

In another aspect of the light fixture, the inner bezel is removably joined to the outer bezel.

In a further aspect of the light fixture, the substantially flat light emitting diode (LED) panel is secured to the inner bezel, and the power circuitry module is releasably attachable to the base frame.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 5 is a front perspective view of a light fixture of a second embodiment of the invention.

FIG. 6 is a front perspective view of a light fixture of a third embodiment of the invention.

FIG. 7 is a partially exploded, front perspective view of the light fixture of the third embodiment.

FIG. 18A is a top plan view of a side bracket from the power circuitry module of the light fixture of FIG. 16. FIG. 18B is a side view of a side bracket from the power circuitry module of the light fixture of FIG. 16.

FIG. 26 is an oblique perspective view of a hinge of the light fixture of FIG. 23, in an opened configuration.

FIG. 27 is a perspective view of a power circuitry module in accordance with a ninth embodiment of the invention.

DETAILED DESCRIPTION OF THE INVENTION

Figure 1:
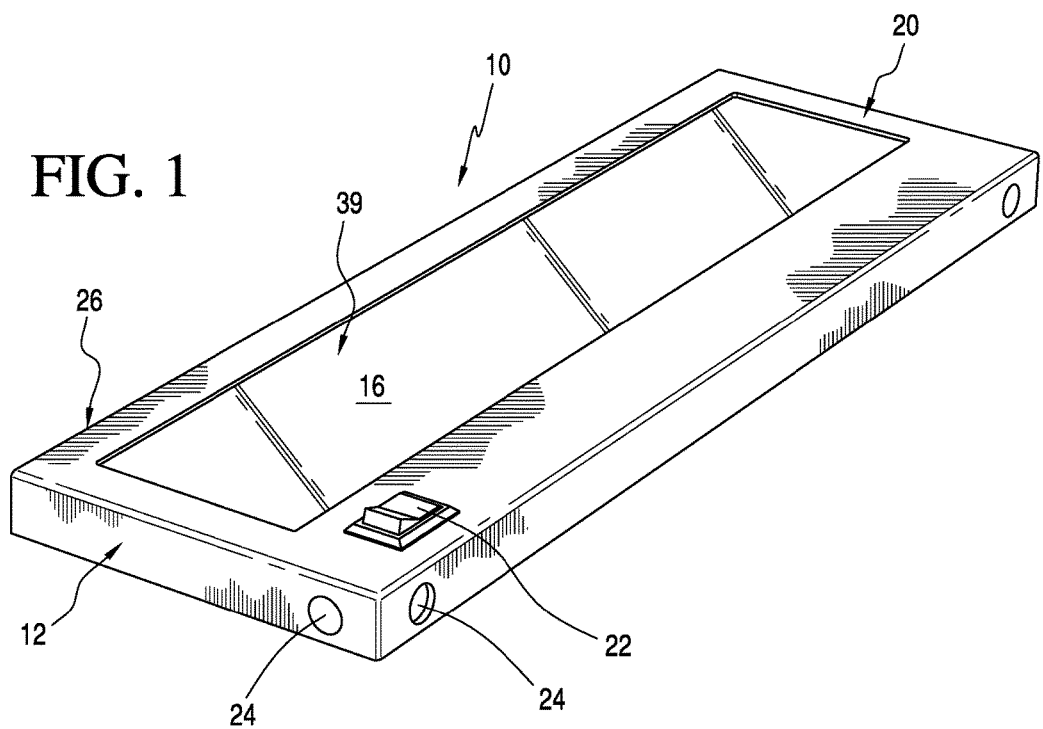
FIG. 1 is a front perspective view of the light fixture of a first embodiment of the present invention.

Referring now to the drawings and the characters of reference marked thereon, FIGS. 1-4 illustrate a first embodiment of an LED light fixture, designated generally as 10. As seen in FIG. 1, the light fixture 10 includes a frame 12. Light is emitted from an emission area 16 at a front surface of the light fixture 10. (In referring to the light-emitting surface of light fixture 10 as seen in perspective views such as FIG. 1 the present patent application uses the term "front" surface, and alternatively describes this surface as a "top" or "upper" structure of the light fixture 10. Similarly, this patent application uses the term "rear" or "back" surface of the light fixture 10 in referring e.g. to the rear perspective view of FIG. 2, and alternatively describes this surface as a "bottom" structure of the light fixture 10). Light is emitted from an emission area 16 at a front surface of the light fixture 10. The emission area 16 has a substantially rectangular aperture; wherein "aperture" indicates linear dimension(s) of the emission area.

Exterior features of the frame 12 include a bezel portion 20 of the frame surrounding the emission area 16. As described herein, the bezel portion 20 may serve as a cover structure for interior components of light fixture 10. The front surface of the frame 12 may include a switch 22. Additionally, appropriate openings 24 and/or other cutaways may be provided for access by wires or other electrical connectors, such as wiring carrying AC power in, wiring carrying DC power in, and/or wiring carrying DC power out.

Figure 2:
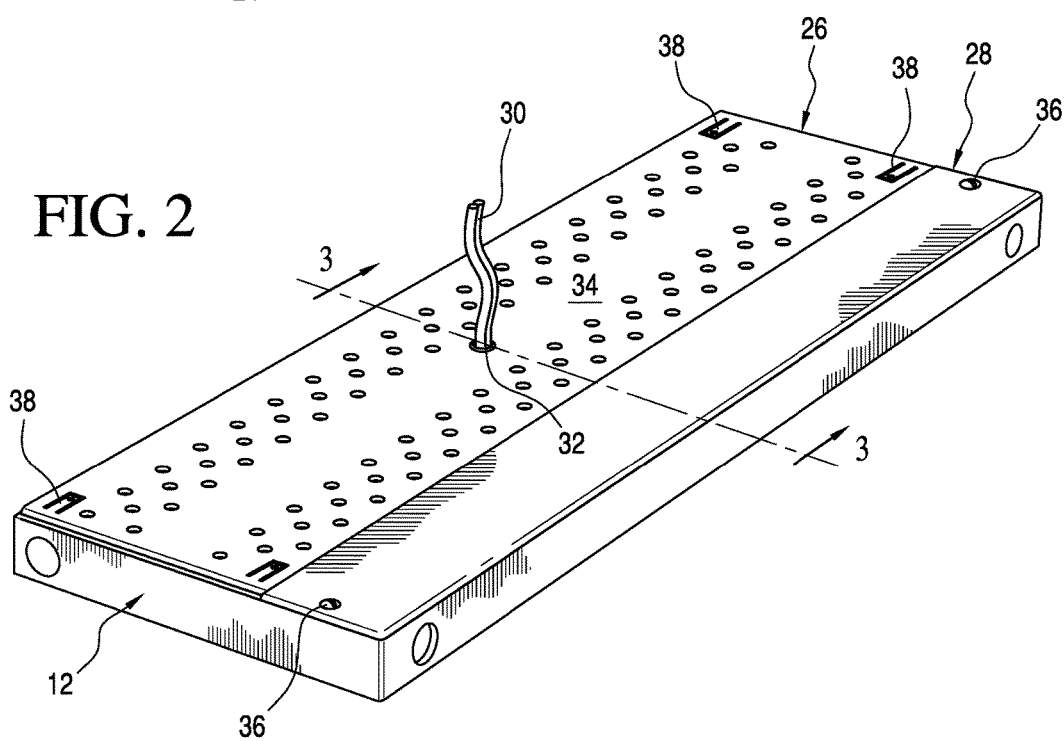
FIG. 2 is a rear perspective view of the light fixture of FIG. 1.
Figure 3:
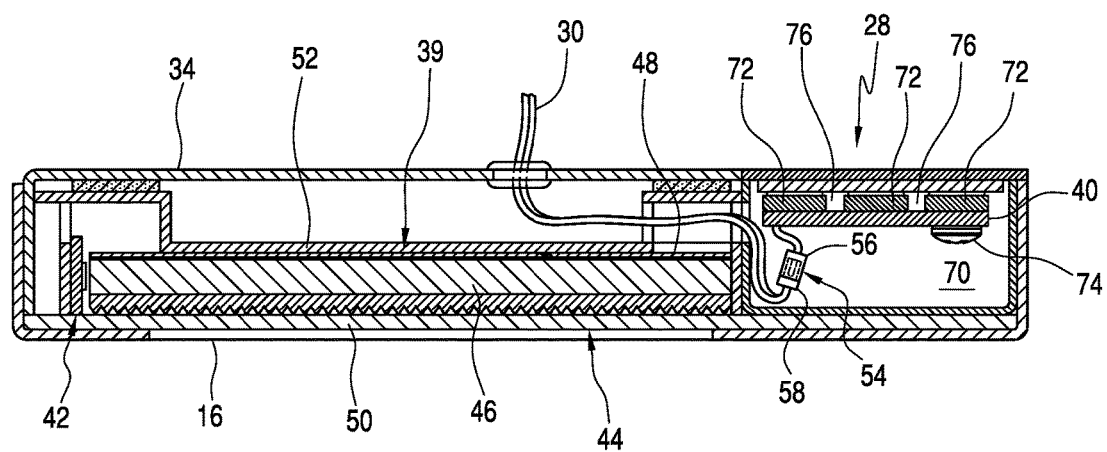
FIG. 3 is a cross-sectional view, partially in perspective, of the light fixture of the first embodiment taken along line 3-3 of FIG. 2.
Figure 4:
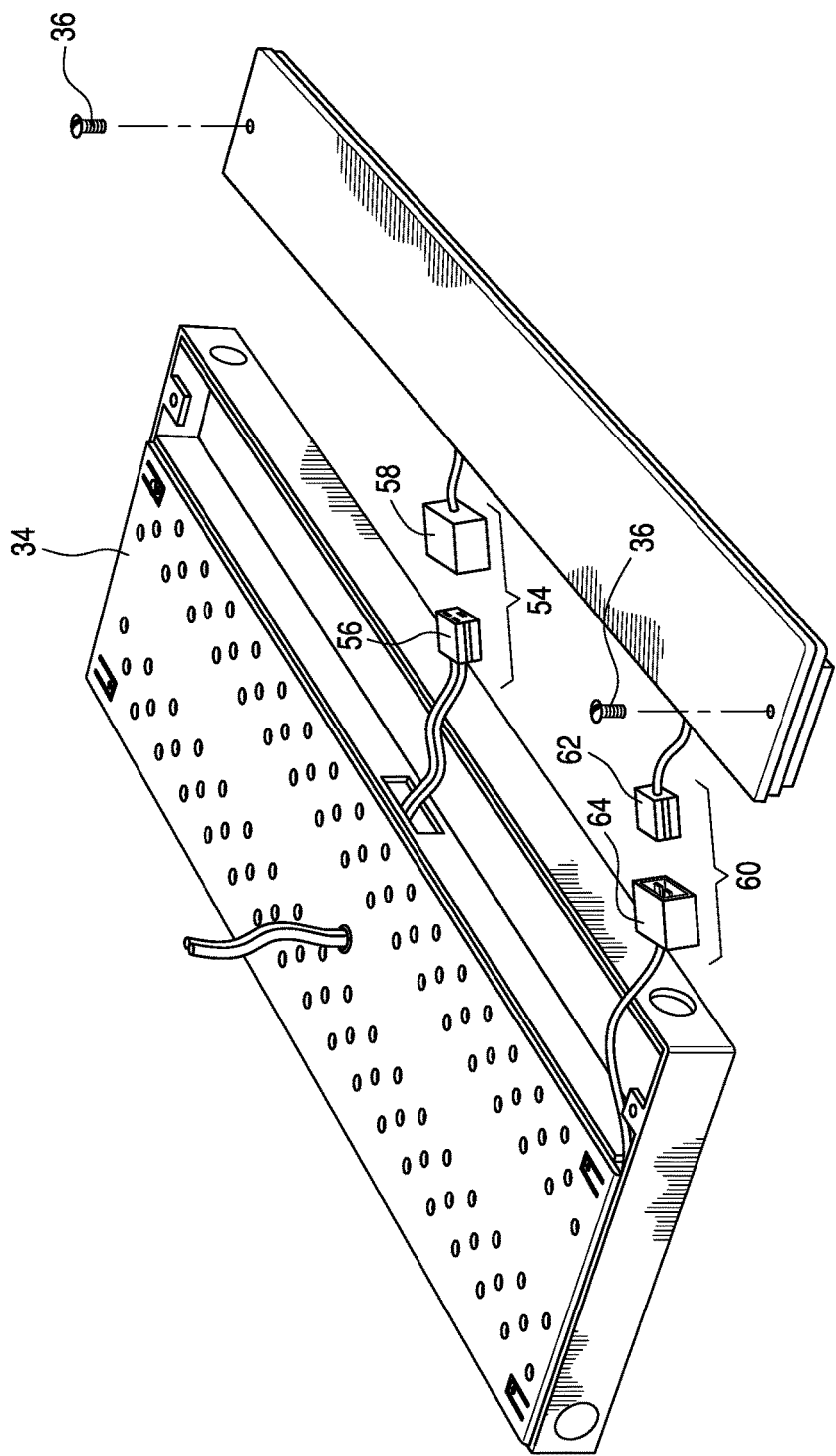
FIG. 4 is a perspective view of the light fixture of the first embodiment, showing the separation of the power circuitry module from light emitting panel assembly light emitting panel assembly, in progress.

As seen in the FIGS. 2-4, light fixture 10 includes two major subassemblies, a light emitting panel assembly 26 and a power circuitry module 28. Power circuitry module 28 is releasably attached to the light emitting panel assembly 26, to facilitate removal and replacement of the power circuitry module 28 after installation of the light fixture 10. Principal structures of the light emitting panel assembly 26 include the frame 12, and a substantially flat light emitting diode (LED) panel 39 disposed within the frame. Mechanical fasteners 36 secure power circuitry module 28 to light emitting panel assembly 26. Frame 12 may be integrally formed with other components of light emitting panel assembly 26 or may be permanently or releasably attached to these other components.

Mounting tabs 38 with apertures may be used to mount light fixture 10 in various installations. For example, as described in U.S. Pat. Pub. No. 20130044512, entitled "FLAT PANEL LIGHTING DEVICE AND RETROFIT KIT," published Feb. 21, 2013 (Ser. No. 13/473,918, filed May 17, 2012), the aperture mounting tabs may be folded 90 degrees from the rear surface 34 of light fixture 10 to hang the light fixture from a ceiling using wires secured through the tab apertures, also called pendant mounting.

In a preferred construction of light fixture 10, the frame 12 is comprised of a metal, a metal alloy, or a composite material including a metal. For example, the frame may be comprised of ferrous metals, or non-ferrous metals such as aluminum, brass, bronze, copper, and stainless steel. The frame may include a surface treatment such as electroplating or powder coating. Surface treatments for improved durability, such as rust-proofing, may be applied to frame 12.

The substantially flat light emitting diode (LED) panel 39 is disposed within the frame 12. The light emitting diode (LED) panel 39 includes an optically transmissive panel assembly 44; and, the set of light emitting diodes (LEDs) 42 extending adjacent an edge surface of the optically transmissive panel assembly, sometimes referred to as an LED bar or LED strip. The term "substantially flat light emitting diode (LED) panel" as used in connection with the description of the various embodiments, is meant to include LED panels having a thickness that is substantially less than the length and width of the LED panel. As used in the present patent application, the term "light emitting diodes" (or "LEDs") optionally includes a lens or other optical interface (not shown) between the LEDs 42 and the optically transmissive panel assembly 44.

As seen in the cross sectional view of FIG. 3 and in FIGS. 1 and 2, the substantially flat light emitting diode (LED) panel 39 and power circuitry module 28 are fitted side-by-side within a unitary frame 12, which enables the design of light fixtures 10 of limited thickness and attractive appearance. In one embodiment, the frame 12 has a thickness less than 1.0 inch. In another embodiment, the frame 12 has a thickness less than about 0.7 inch. In a further embodiment, the frame 12 has a thickness less than about 0.5 inch.

The light fixture 10, including the substantially flat light emitting diode (LED) panel 39, may take on a variety of dimensions and form factors, including, but not limited to, rectangular, other polygonal (e.g., octagonal), circular and elliptical form factors. For example, the light fixture 10 can be rectangular with a size of approximately two feet by four feet (2 feet×4 feet), corresponding to an exemplary lower dimension of a standard fluorescent ceiling troffer. In another exemplary embodiment, the light fixture 10 can have dimensions of about one foot by about four feet. In yet another exemplary embodiment, the light fixture 10 can be sized to standard lengths for under counter or under cabinet lighting applications (12 inches, 18 inches, 24 inches, 36 inches, etc.).

The power circuitry module and the light emitting panel assembly may have a variety of configurations within the overall form factor of the light fixture. Typically, the power circuitry module 28 disposed within the frame 12 adjacent an edge of the frame, and the substantially flat light emitting diode (LED) panel 39 is located more centrally within the frame. It is also possible to locate the power circuitry module at an interior space surrounded by the light emitting power assembly 26. It is also possible for the power circuitry module to be located at more than one edge of the light emitting panel assembly, as in the embodiment of FIGS. 14 and 15, in which the power circuitry module occupies two edges of the light fixture 220.

As discussed below with respect to the embodiment shown in FIGS. 16-19B, the frame may define an aperture configured to receive the power circuitry module, for example an elongate substantially rectangular aperture. The power circuitry module may include a cover member (e.g., a cover plate) releasably attachable to the frame and configured to cover the aperture. As defined in the present patent application, the power circuitry module is "disposed within the frame" if the power circuit, source electrical connector, and driver electrical connector of the power circuitry module are located within the frame, even if a cover member or other structural component of the power circuitry module includes an exterior surface of the light fixture.

FIG. 2 shows power lines or leads 30 running from a wiring ingress structure, e.g., grommet 32, at the rear surface 34 of light emitting panel assembly 26. Leads 30 provide power to light fixture 10 from an external power supply (not shown), for example an AC power supply such as a junction box. Referring to FIG. 3, a power circuit 40 in power circuitry module 28 is operatively coupled to the AC power supply external to the light fixture 10, and converts the AC power to DC power to power the set of light emitting diodes (LEDs) 42. The set of LEDs 42 may be supported by a heat dissipating structure, such as one or more array, strip, or bar of LEDs. Various forms of LEDs packaging may be employed, including for example surface mounted packages that mount LEDs to a printed circuit board. Surface mounting of LEDs typically dissipates heat efficiently. However, it is understood that other LEDs packaging such as pin mounted LEDs may be utilized.

The optically transmissive panel assembly 44 encompasses all light-transmissive, reflective, or refractive structures in the light path from the sets of light emitting diodes (LEDs)—but not including these LEDs or any lens or other optical interface adjacent the LEDs—to the emission area 16. In one embodiment, as shown in FIG. 3, the optically transmissive panel assembly 44 includes a light guide plate (LGP) 46 in combination with light-reflective and light-transmissive films, sheeting, or coatings. The optically transmissive panel assembly 44 may include separate component parts assembled during production of light fixture 10, or may comprise a composite structure. LGP 46 may be comprised of an extremely transparent plastic material such as an acrylic or polycarbonate resin; e.g., LGP 46 may be made from poly(methyl methacrylate) (PMMA) resin. On the bottom of the light guide plate a matrix of lines or microstructures can be formed, dots can be printed, or particulates can be added to the panel polymer.

In the embodiment of FIG. 3, optically transmissive panel assembly 44 includes the light guide plate (LGP) 46, reflector 48 (also referred to as a reflective film), and a diffuser 50 at the front surface (emission area 16) of the optically transmissive panel assembly 44. In an advantageous embodiment, diffuser 50 comprises a hard transparent plastic sheet that also serves to seal or water-proof light fixture 10 at its front surface. This diffuser sheet 50 may be covered at its edges by the bezel 20, and silicone potting material (not shown) may be used under the bezel 20 to support the diffuser 50.

The reflector 48 reflects light that is refracted out of the bottom surface back through the light guide plate 46. The diffuser 50 scatters the light received from the light guide plate 46. Instead of or in addition to the diffuser, the light-transmissive sheeting or film can be configured to modify or otherwise direct the distribution of light received from the reflection panel in a variety of ways (also herein called "patterning film"; as used herein, this term encompasses thin flexible films as well as rigid and semi-rigid sheeting). Various types and uses of patterning films in LED panel lighting fixtures are disclosed in U.S. patent application Ser. No. 14/246,823, entitled "LIGHTING ASSEMBLY".

Referring further to FIG. 3, the light emitting panel assembly includes rear cover 34 which fits within frame 12 adjacent the power circuitry module 28, and a platform 52 which supports the components of the substantially flat light emitting diode (LED) panel 39. AC input line 30 runs from wire inlet or grommet 32, routed between rear cover 34 and platform 52, to power circuitry module 28. Within the power circuitry module 28, the AC line includes a decouplable source electrical connector 54 that forms an electrical connection to the power circuit 40. As seen in FIG. 3 and further described with reference to FIG. 4, decouplable source electrical connector 54 comprises a first portion of a source electrical connector 58 electrically coupled to power circuit 40, and a second portion of a source electrical connector 56 electrically coupled to the AC power source (not shown) external to light fixture 10, wherein the first portion of a source electrical connector and second portion of a source electrical connector can be decoupled from each other. FIG. 4 also shows a decouplable driver electrical connector 60 that forms an electrical connection of the power circuit 40 to the set of LEDs 42. The decouplable driver electrical connector 60 comprises a first portion of the driver electrical connector 62 electrically coupled to power circuit 40, and a second portion of the driver electrical connector 64 electrically coupled to the set of LEDs 42, wherein the first portion of the driver electrical connector and second portion of the driver electrical connector can be decoupled from each other.

The electrical connectors of FIGS. 3 and 4 exemplify mobile power connectors or plugs, i.e., electrical connectors that are not fixed in place. For example, the source electrical connector 54 may comprise three-pin AC-power connector plugs with internal male and female pin configurations. For safety reasons, the first source electrical connector portion 58 electrically coupled to power circuit 40 preferably has a male pin configuration, while the second source electrical connector portion 56 electrically coupled to the AC power source preferably has a female pin configuration. In this way, the electrical connector portion coupled to the AC power source has concealed contacts to prevent inadvertent touching of live conductors carrying voltage or current sufficient to cause injury. The driver electrical connector 60 may comprise two-pin DC-power connector plugs with internal male and female pin configurations. The first portion of the driver electrical connector 62 electrically coupled to power circuit 40 preferably has a female pin configuration, while the second portion of the driver electrical connector 64 electrically coupled to the LEDs 42 preferably has a male pin configuration.

Power circuitry module 28 includes a cover or shell 66 releasably attached within frame 12 next to the rear cover 34 of light emitting panel assembly 26. Power circuitry module 28 preferably is an elongate structure in keeping with the preferred nature of the power circuit contained within the power circuitry module. In FIG. 3, the power circuit 40 comprises a printed circuit board having a length-to-width ratio of at least five-to-one. Alternatively, the length-to-width ratio of the printed circuit board may be at least ten-to-one. The relatively long and narrow form factor and compact configuration of power circuit 40 allows it to be housed within a first channel 70 defined within the shell 66. For example, power circuit 40 may have dimensions of approximately 20 centimeters in length, approximately 15 millimeters of width and approximately 15 millimeters in height. It will be appreciated that the disclosed technology is not limited to these exemplary dimensions. The first channel 70 within power circuitry module 28 can take on other dimensions without departing from the scope of the disclosed technology. Such a compact power circuit can be obtained by employing miniaturized power boards and components.

Metal heat sink backing pieces 72 (here shown in section) between the power circuit and shell 66 may comprise three aluminum pieces that collectively are of similar length and width to the dimensions of power circuit board. These heat sink backing pieces may include slits 76 along their length in order to facilitate heat dissipation. A fastener 74 secures the power circuit to the shell 66; different than the mechanical fasteners 36 that releasably attach the power circuitry module to the light emitting panel assembly 26.

The light fixture 10 of FIGS. 1-4 is configured to permit installation of the light fixture, and convenient removal and replacement of the power circuitry module 28 during routine maintenance or other event such as failure of power circuit 40. The light fixture embodiment of FIGS. 1-4 is configured for removal and replacement of the power circuitry module 28 from the rear of the light fixture without removal of the remainder of light fixture 10 from its installation, such as a pendent or hanging lighting installation. FIG. 4 illustrates detachment and separation of the power circuitry module 28 from the light emitting panel assembly 26. Fasteners 36 have been removed, and power circuitry module has been pulled out of the remainder of light fixture 10 from the rear. Once the power circuitry module is separated from the light emitting panel assembly, completing the removal of the power circuitry module requires decoupling of the source electrical connector 54 and the driver electrical connector 60. The first source electrical connector portion 58 is disconnected from the second source electrical connector portion 56, and the first portion of the driver electrical connector 62 is disconnected from the second source electrical connector portion 64. The first source electrical connector portion and first portion of the driver electrical connector remain with the power circuitry module 28, which can now be removed. The second source electrical connector portion and second portion of the driver electrical connector remain with the light emitting panel assembly 26. A replacement power circuitry module (not shown) may then be electrically coupled to these electrical connector portions and mechanically attached to the light emitting panel assembly 26.

LED light fixtures in accordance with the present invention may incorporate one or more field-replaceable power circuitry module in a variety of configurations, which may depend for example on the manner in which the light fixture is intended to be mounted. Pending mounting of the light fixture 10 of FIGS. 1-4, and removal from the rear of the power circuitry module from the rear, is described above. In another example, in recessed mounting the LED light fixture may be configured to be mounted within a recess in a wall, ceiling or other surface, leaving only the front surface of the light fixture exposed. In this type of installation, the light fixture may be configured to remove and replace the power circuitry module from the front surface of the light. In a surface mount installation, the light fixture may be mounted to a wall, ceiling, under-cabinet or under-counter surface, or other surface so as to leave the light fixture exposed. In this type of installation, the light fixture may be configured to remove and replace the power circuitry module from a side surface of the light fixture. LED light fixture embodiments with front-removable power circuitry modules, and with side-removable power circuitry modules, are described below.

Turning now to FIGS. 5-13, these views illustrate further embodiments in which one or more power circuitry module is configured to be removed from the front of the light fixture, and configured to be removed from the side of the light fixture, respectively. FIGS. 5-13 illustrate light fixture embodiments in which at least one power circuitry module is disposed within the frame adjacent at least one edge of the frame, and in which a substantially flat light emitting diode (LED) panel including an optically transmissive panel and an array of light emitting diodes (LEDs) is disposed adjacent at least a second edge of the frame. FIG. 5 is a front perspective view of light fixture 78 with a power circuitry module 80 releasably attached to the remainder of the light fixture (light emitting panel assembly 82) at one of the short edges of the light fixture. Light fixture 78 also includes LEDs modules 84 and 86 at both long edges of the light fixture, releasably attached to fixture 78 e.g., using fasteners 88. FIG. 6 is a front perspective view of light fixture 144 with two power circuitry modules 146 and 148, respectively located at the short edges of the light fixture 144 and releasably attached to the light emitting power assembly 150 comprising the remainder of the light fixture.

Referring generally to FIGS. 6, 7, 10, 12 and 13, FIG. 7 shows the light fixture of FIG. 6 with an exploded view of the components of one of the power circuitry modules 146, which is configured to be removed from the front surface of light fixture 144. A similar power circuitry module 148 (the components of which are not shown) is located at the opposite end of light fixture 144, and power circuits within these power circuitry modules 146 and 148 drive two arrays of LEDs (not shown) at opposite long sides of light fixture 144. An L-bracket cover plate 152 releasably attached to light fixture 144 by screws 154, and a base area 156 of frame 158 below the L-bracket, define between them a first channel 160. First channel 160 contains a horizontally extending circuit board 162, and first source electrical connector portion 164 and second source electrical connector portion 166 that respectively form a source electrical connector 168 located at or near the center of circuit board 162, and first portion of the driver electrical connector 172 and second portion of the driver electrical connector 174 that respectively form a driver electrical connector 170 located near one edge of circuit board 162. Source electrical connector 168 and driver electrical connector 170 exemplify fixed power connectors or jacks, including complementary electrical connector portions fixed in place below the circuit board 162 and above the base area 156 of frame 158.

Figure 13:
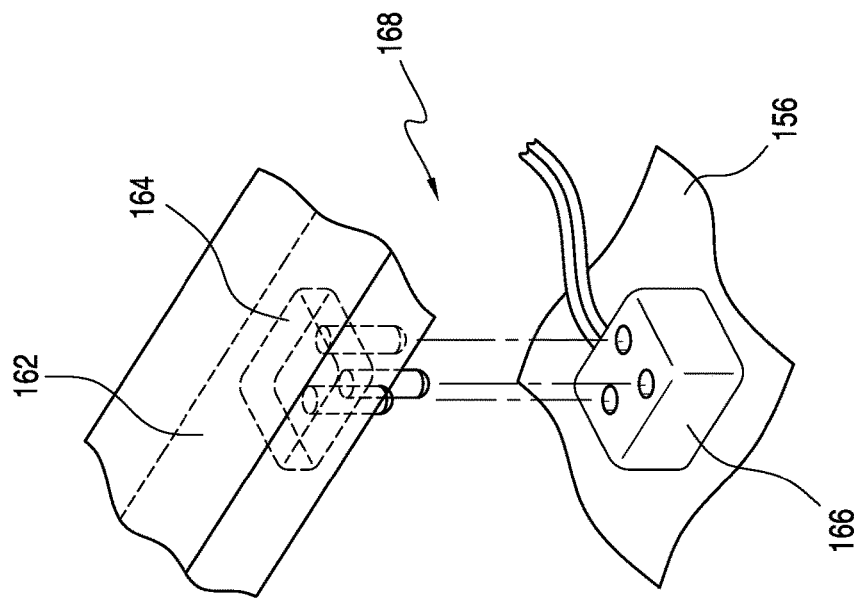
FIG. 13 is a close up perspective view of the source electrical connector of the light fixture of the third embodiment, in the form of fixed power connectors or jacks.
Figure 12:
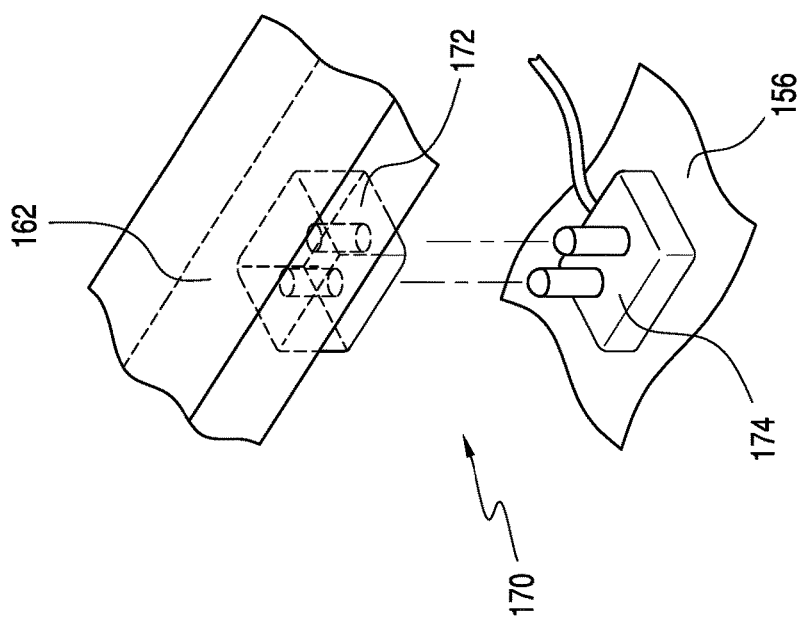
FIG. 12 is a close up perspective view of the driver electrical connector of the light fixture of the third embodiment, in the form of fixed power connectors or jacks.

FIG. 12 shows the driver electrical connector 170 as complementary two-pin DC-power jacks including a first portion of the driver electrical connector 172 (female pin configuration) facing downwardly below circuit board 162, and a second portion of the driver electrical connector 174 (male pin configuration) facing upwardly on base area 156. FIG. 13 shows the source electrical connector 168 as complementary three-pin AC-power jacks including a first source electrical connector portion 164 (male pin configuration) facing downwardly below circuit board 162, and a second source electrical connector portion 166 (female pin configuration) facing upwardly on base area 156. During removal of the power circuitry module 146, at the same time that the power circuitry module is detached and separated from the light emitting panel assembly (front surface of light fixture 144), these power connector jacks are configured to be decoupled. During replacement with a new power circuitry module (not shown), the power connector jacks are reengaged as the power circuitry module is lowered into place to be attached to the light fixture 144. Although FIGS. 12 and 13 illustrate electrical connectors with female pin configurations and male pin configurations, a wide variety of other male-female configurations are known in the art, such as plug- and socket connectors, blade connectors, and a variety of hybrid connectors.

Figure 10:
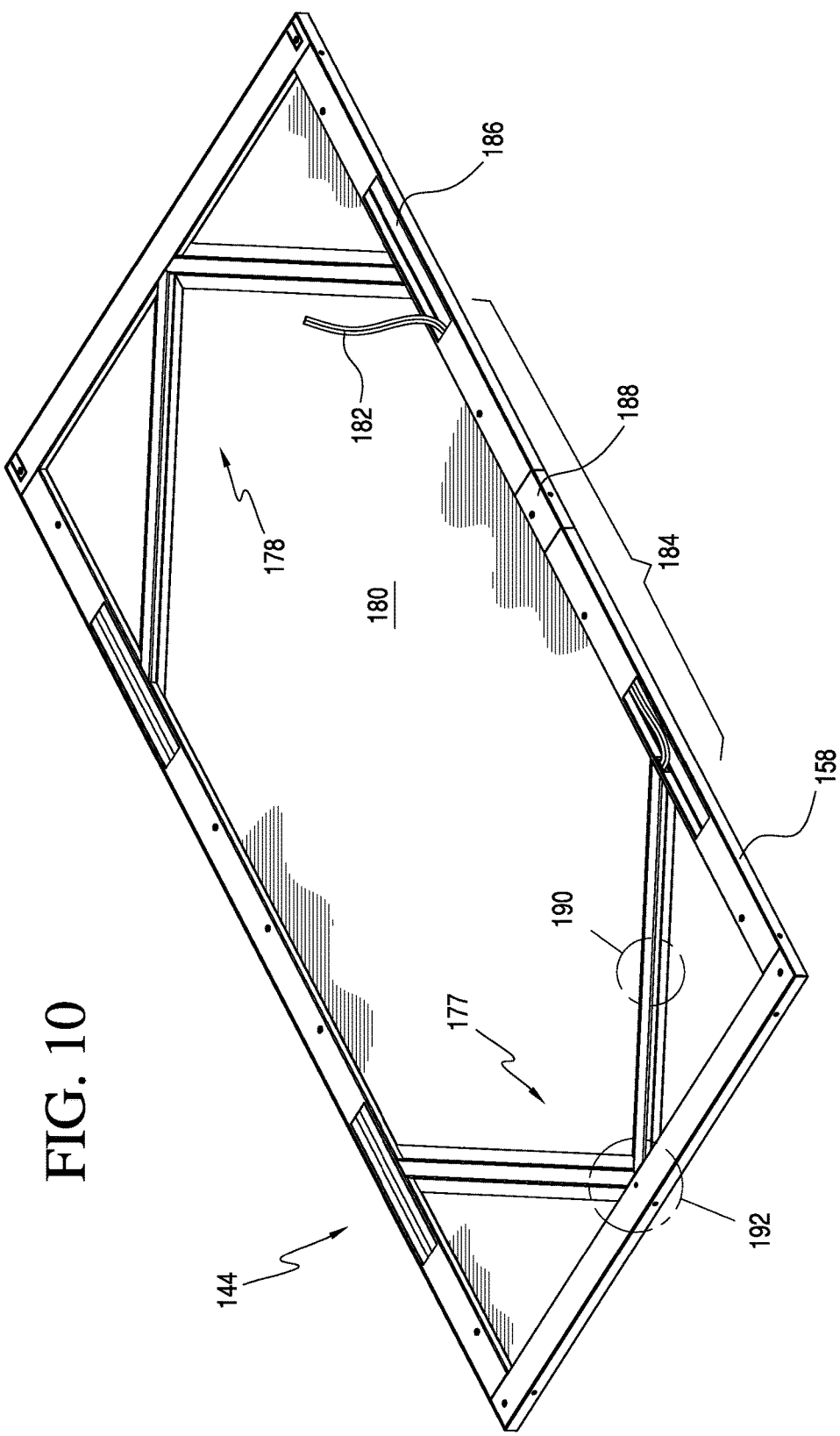
FIG. 10 is a rear perspective view of the light fixture of the third embodiment.

FIG. 10 shows a rear perspective view of the light fixture 144 of FIG. 6. As described in more detail in applicant's patent application entitled FLAT PANEL LIGHTING DEVICE, U.S. Provisional Application No. 61/917,059, filed Dec. 17, 2013, two wire-ways 176 and 178 are mounted to the rear surface 180 of light fixture 144. Wire-ways 176 and 178 respectively route AC leads 182 from a wiring compartment 184 at a long edge of frame 158; the AC leads or wires 182 are routed from a wire ingress opening 186 to the wiring compartment 184 from an external AC power supply (not shown). Wire-ways 176 and 178 respectively communicate with the power circuitry modules 146 and 148 at opposite short ends of the light fixture 144 to route the AC leads to the power circuitry modules. The light fixture 144 includes a luminaire disconnect 188, i.e., a device to disconnect the AC power from the source electrical connector of light fixture 144, such as a luminaire disconnect located at the AC leads 182 at wiring compartment 184. Alternative locations of the luminaire disconnect, in which the decouplable source electrical connector of light fixture 144 is electrically coupled to the external AC power supply through the luminaire disconnect, can include location 190 (at the wire-way 176), and location 192 (at a junction of the wire-way to the power circuitry module 146).

Figure 8:
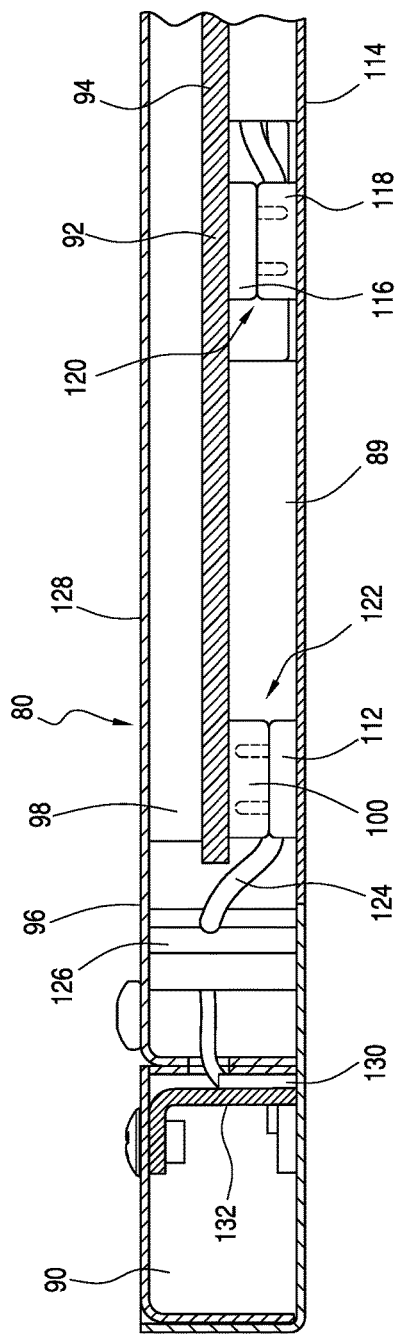
FIG. 8 is a cross-sectional view of an edge region of the light fixture of the second embodiment, taken along line 8-8 of FIG. 5.
Figure 9:
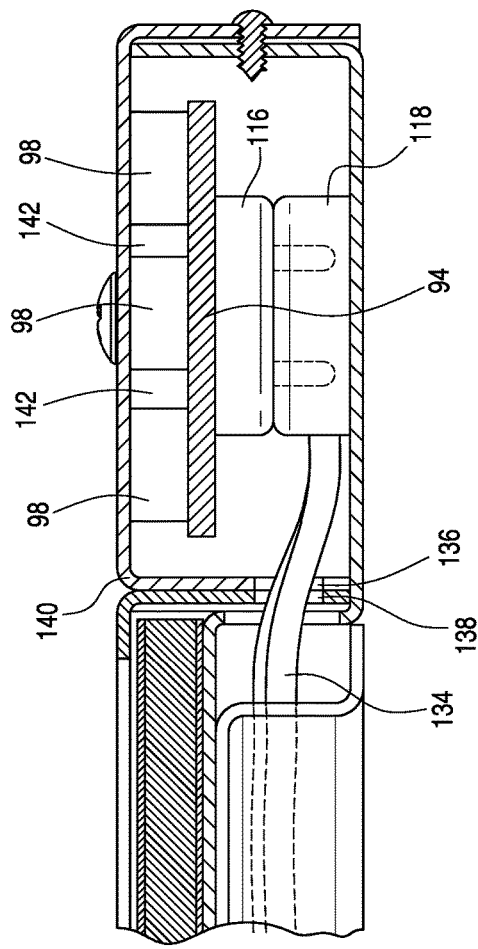
FIG. 9 is a cross-sectional view of part of the light emitting panel assembly; and of the power circuitry module of the light fixture of the second embodiment, taken along line 9-9 of FIG. 5.

Now turning to FIGS. 5, 8, and 9, FIG. 8 shows a partial longitudinal section of the power circuitry module 80 encompassing a portion of the first channel 89 within the power circuitry module, and a section of a second channel 90 adjacent one end of the power circuitry module 80. Power circuit 92 on a horizontally oriented circuit board 94 is attached to a cover 96 of the power circuitry module via a heat sink 98 that extends along the length of the circuit board. A first portion of the driver electrical connector 100, consisting of a DC-power jack having a female pin configuration, is mounted below circuit board 94 near the end of the circuit board, facing downwardly. First portion of the driver electrical connector 100 is coupled to a second portion of the driver electrical connector 112 consisting of a DC-power jack having a male pin configuration and supported by the frame 114 of light fixture 78. A first source electrical connector portion 116, consisting of an AC-power jack having a male pin configuration, is mounted below circuit board 94 near the center of the circuit board (toward the right side of this partial view), facing downwardly. First source electrical connector portion 116 is coupled to a second source electrical connector portion 118 consisting of an AC-power jack having a female pin configuration and supported by the frame 114 of light fixture 78. The first and second portions 116, 118 of the source electrical connector are electrically coupled to form the source electrical connector 120 while the first and second portions 100, 112 of the driver electrical connector are electrically coupled to form the driver electrical connector 122.

DC power leads 124 extend from the second driver electrical connector, through a dam 126 and through an aperture in the cover 128 of power circuitry module 80, to be electrically coupled to a set of LED's in a second channel 90 adjacent power circuitry module 80, this second channel 90 extending into this view along one of the long sides of light fixture 78. The set of LEDs 130 are surface mounted to a circuit board supported by an L-shaped bar 132. As seen in FIG. 5, LEDs module 84 is disposed within the frame (second channel 90) and contains an array of light emitting diodes (LEDs) and supporting structures. The LEDs module is releasably attachable to the frame at one of the long sides of light fixture 78. The LEDs module 84 may be detached and removed from light fixture 78, including electrical disconnection from the driver electrical connector 122, then replaced with a new LEDs module, using a similar procedure to the procedure for removing and replacing a power circuitry module.

FIG. 9 shows in cross-section a central area of power circuitry module 80, and a partial cross section of an adjacent portion of the light emitting panel assembly 82. Referring to FIGS. 8 and 9, AC power leads 134 extend from the second source electrical connector portion 118, through adjacent openings 136, 138 in the cover 128 of the power circuitry module and cover 140 of the light emitting panel assembly 82, to be routed to an AC power supply (not shown) external to the light fixture 78. Other elements of the light emitting panel assembly 82, such as optically transmissive panel assembly, may be generally similar to those shown in FIG. 3. Similar to the embodiment of FIG. 3, the circuit board 94 may be coupled to cover 128 using metal heat sink backing pieces 98, which may comprise three aluminum pieces that collectively are of similar length and width to the dimensions of the power circuit board. These heat sink backing pieces may include slits 142 along their length in order to facilitate heat dissipation. First and second source electrical connector portions 116 and 118 are shown coupled below circuit board 94.

Figure 11:
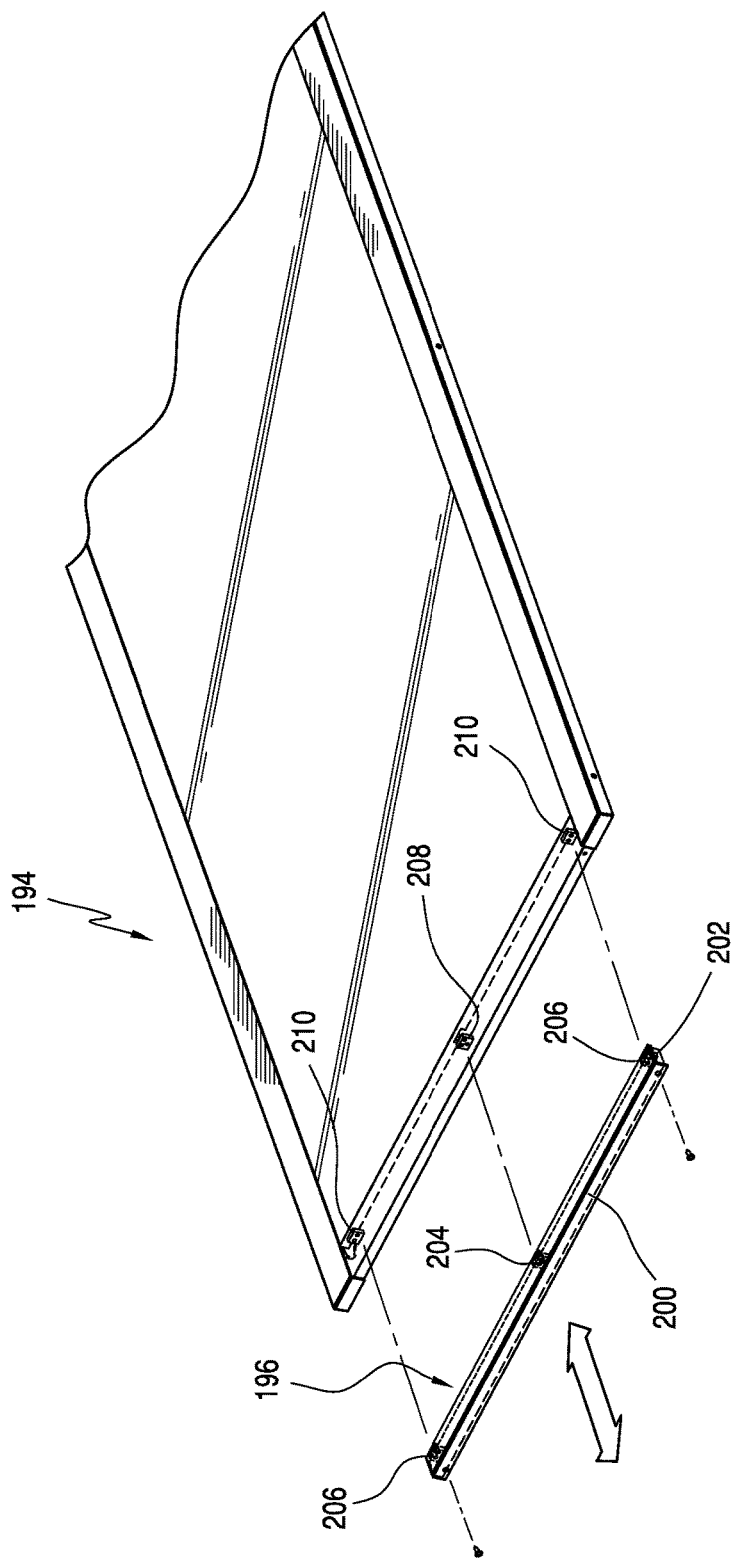
FIG. 11 is a partially exploded, partial front perspective view of a light fixture of a fourth embodiment of the invention.

FIG. 11 shows a further light fixture 194 embodiment with a power circuitry module 196 removed. Power circuitry module 196 is configured to be removed from a side surface 198 of light fixture 194. Power circuitry module 196 includes L-bracket 200; circuit board 202 pending from L-bracket 200 in a vertical orientation; first source electrical connector portion 204 secured at or near the center of the circuit board; and a pair of first driver electrical connector portions 206 secured at opposite ends of circuit board 202. The separation of power circuitry module 196 from light fixture 194 reveals a second portion of the source electrical connector 208, and a pair of second driver electrical connector portions 210. The second portions 204 and 208 of the source electrical connector advantageously consist of complementary three-pin AC-power jacks similar to those shown in FIG. 13, but with a side-facing orientation. Each of the pair of driver electrical connector portions 206, 210 advantageously consist of complementary two-pin DC-power jacks similar to those shown in FIG. 12, but with a side-facing orientation. During removal and replacement of power circuitry module 196 from the side, these power connector jacks are disengaged as the power circuitry module is separated from the light fixture 194, and are reengaged as a new power circuitry module is attached to the light fixture 194.

Figure 14:
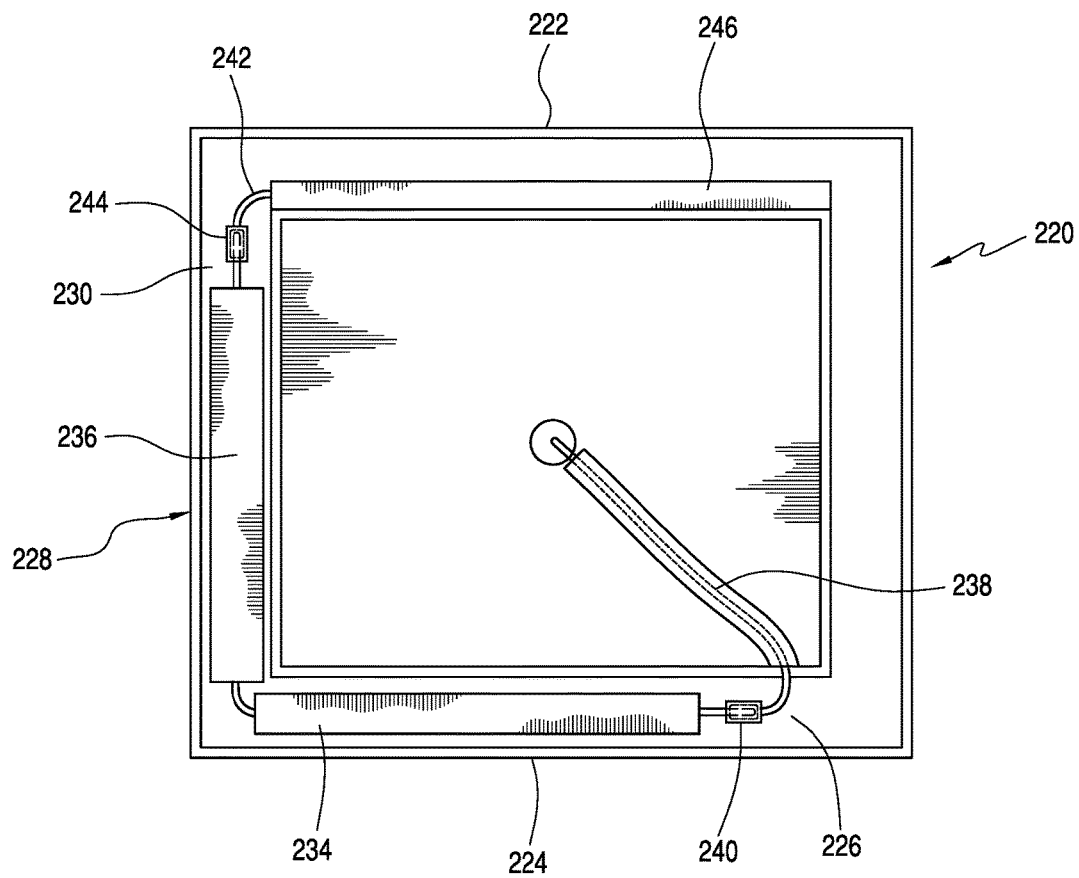
FIG. 14 is a diagrammatic illustration of a light fixture in which the power circuitry module extends across two edge channels in accordance with a fifth embodiment of the invention.
Figure 15:
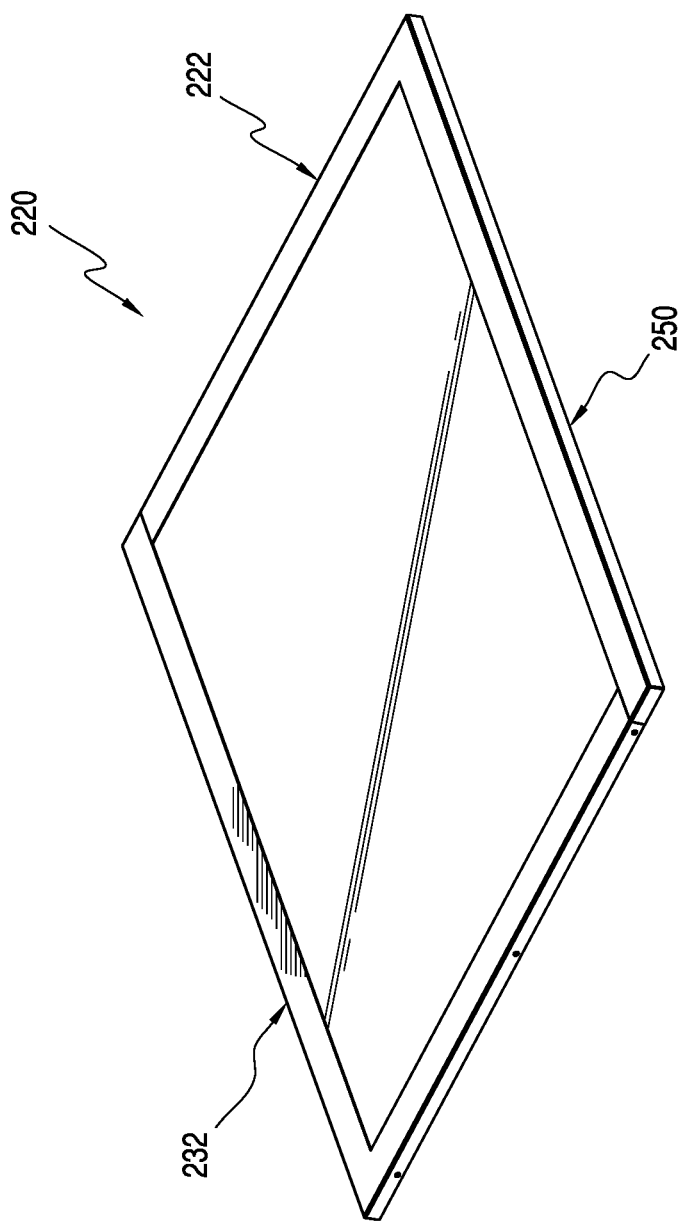
FIG. 15 is a front perspective view of the light fixture of FIG. 14.
Figure 16:
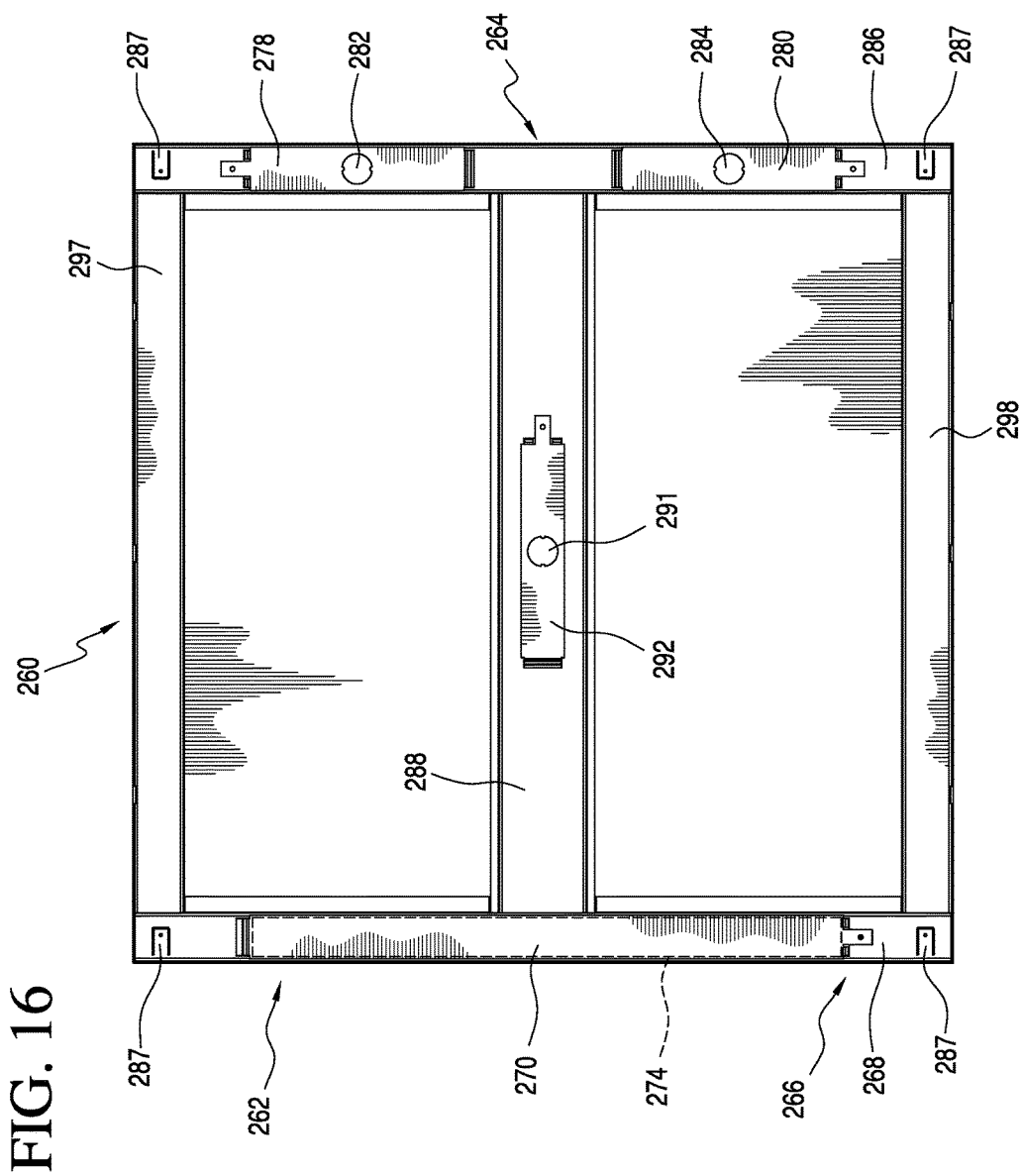
FIG. 16 is a rear plan view of a light fixture in accordance with a sixth embodiment of the invention.
Figure 17:
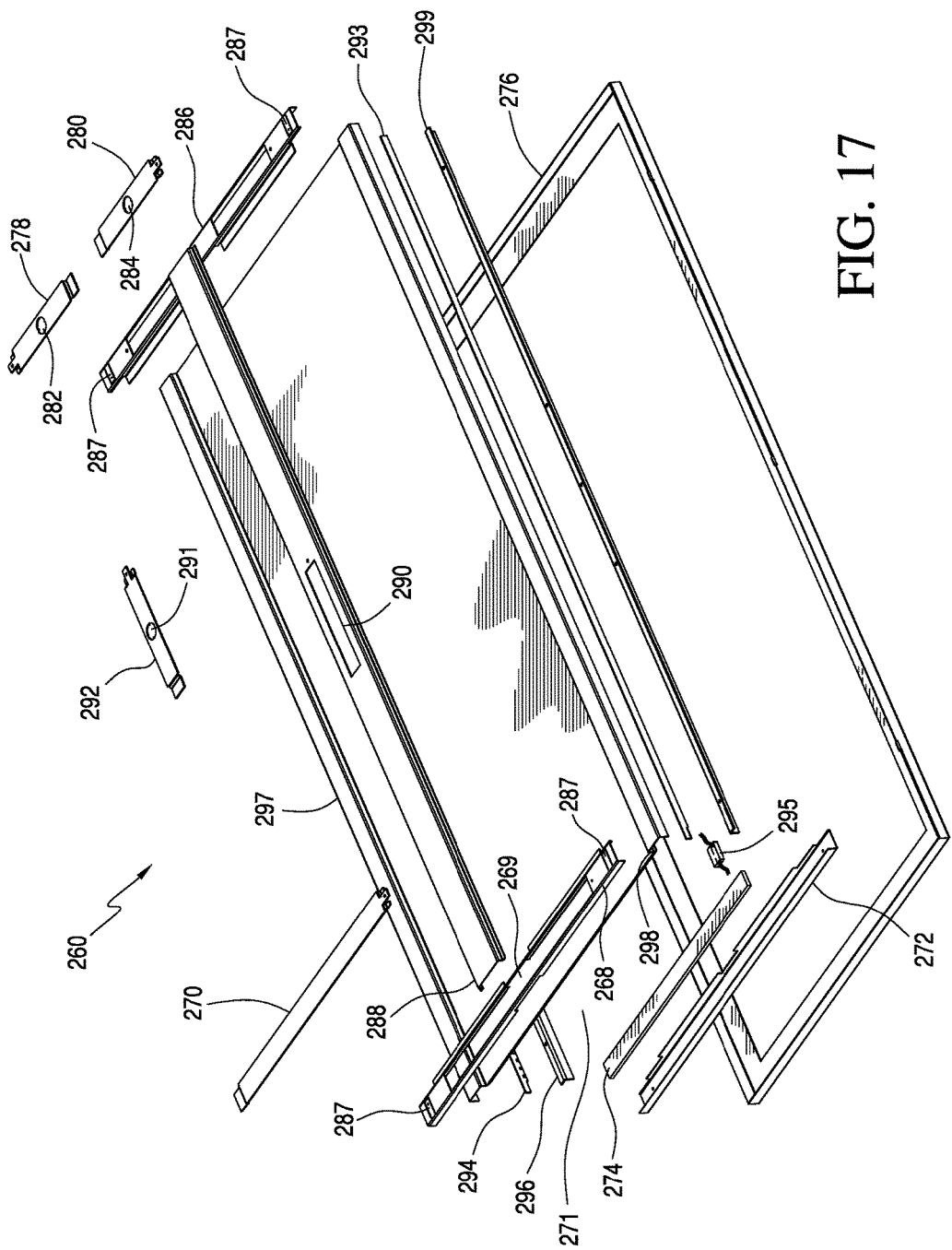
FIG. 17 is an exploded perspective view of the light fixture of FIG. 16.
Figure 19A:
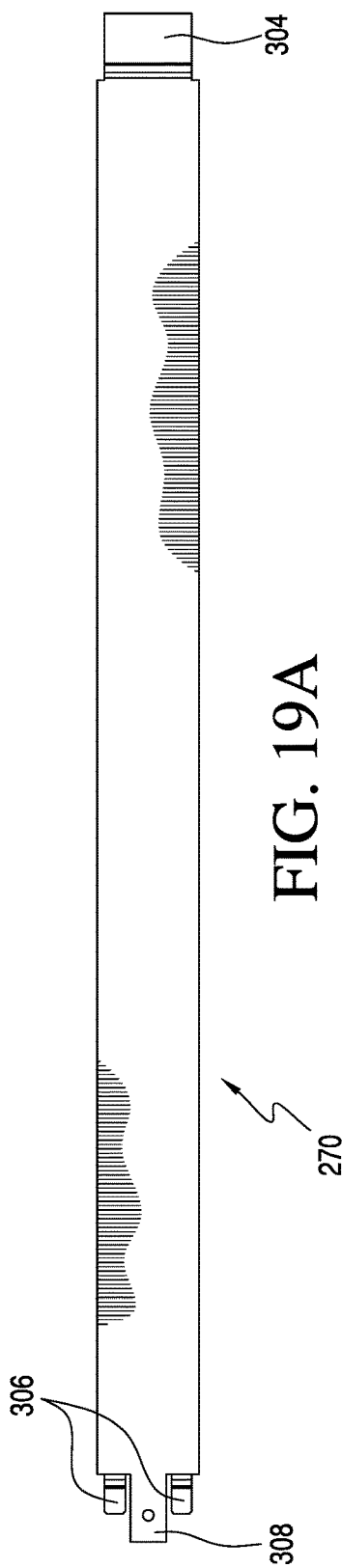
FIG. 19A is a top plan view of a cover plate from the power circuitry module of the light fixture of FIG. 16.
Figure 19B:
FIG. 19B is a side view of a cover plate from the power circuitry module of the light fixture of FIG. 16.

Turning now to FIGS. 14 and 15, lighting fixture 220 includes a frame 222 with a first edge 224 adjacent a first edge channel 226, and a second edge 228 adjacent a second edge channel 230. Power circuitry module 232 is disposed within the frame 222 adjacent two edges of the frame, while light emitting panel assembly 250 comprises the remainder of light fixture 220, as best seen in FIG. 15. The first edge channel 226 contains a first power circuit portion 234 comprising an AC/DC transformer, while the second edge channel 230 contains a second power circuit portion 236 comprising a DC power supply. First power circuit portion 234 receives AC power via line 238 including decouplable source electrical connector 240, electrically coupled to an AC power source (not shown). Second power circuit portion 236 provides DC power to LEDs array 246 via line 242 including decouplable driver electrical connector 244. Multiple-piece driving circuit layouts are disclosed in applicant's U.S. patent application Ser. No. 14/246,823, entitled "LIGHTING ASSEMBLY."

FIGS. 16-19 show a further light fixture embodiment 260, including a power circuitry module 262 and light emitting panel assembly 264. The frame 276 of light fixture 260 defines an access aperture 269 in a side bracket 268 (part of the frame 276) adjacent an edge of the frame. A cover plate 270 is releasably mounted within the access aperture 269. Cover plate 270 and side bracket 268 serve as rear cover structures of light fixture 260, which together with channel bracket 272 define a channel 271 adjacent an edge of frame 276. Access aperture 269 provides access to the channel and the channel houses the power circuitry module 262. Power circuitry module 262 includes cover plate 270, which supports the power circuit 274. Power circuitry module 262 also includes decouplable electrical connectors, i.e., e.g., a source electrical connector (not shown) that electrically couples the power circuit 274 to a power supply external to light fixture 260, and a driver electrical connector 295 that electrically couples the power circuit 274 to two strips or arrays of light emitting diode (LEDs) 293, 294. In a space-efficient design of light fixture 260, the power circuit 274, the decouplable source electrical connector, and the decouplable driver electrical connector 295 are disposed within the channel 271 adjacent the edge of frame 276.

In the embodiment of FIGS. 16-19, cover plate acts 270 as a cover member that is releasably attachable to the frame 276, is configured to cover the access aperture 269, and serves as part of the power circuitry module 262. Other forms of cover member besides a cover plate also can be employed. Cover plate 270 has an inner surface, and power circuit 274 can be secured to the inner surface of the cover plate. The access aperture 269 is configured to receive the power circuitry module 262; in the illustrated embodiment access aperture 269 is elongate and substantially rectangular. In embodiments in which the power circuit 274 of power circuitry module 262 has a length-to-width ratio of at least five-to-one, access aperture 269 may have a similar length-to-width ratio. Alternatively, the power circuit 274 of power circuitry module 262 may have a length-to-width ratio of at least ten-to-one.

The mounting and removal of the power circuitry module 262 to and from the light emitting panel assembly 264 advantageously uses a mechanism disclosed in U.S. Pat. Pub. No. 20130044512, entitled "FLAT PANEL LIGHTING DEVICE AND RETROFIT KIT," published Feb. 21, 2013 (Ser. No. 13/473,918, filed May 17, 2012) for a knockout bracket, in this case applied to the mounting of cover plate 270 to side bracket 268. This procedure can be understood with reference to FIG. 17, the plan and side detail views of side bracket 268 of FIGS. 18A and 18B, and the plan and side detail views of cover plate 270 of FIGS. 19A and 19B. Cover plate 270 can be secured within the access aperture 269 at one end by a downwardly offset flange 304, and at the other end by downwardly offset forks 306, including an apertured tab 308 between the forks and substantially coplanar with the main body of the cover plate. In accordance with an exemplary embodiment, to insert the cover plate 270 within the cut out (access aperture 269) at the center of the side bracket 268, the user can insert the flange 304 under the side bracket adjacent one side of the access aperture, then pivot the other end of the cover plate into the access aperture cutout. The user would then slide the forked end 306 of the cover plate under the other end of the access aperture, with the apertured tab 308 resting above the side bracket's edge surface. The cover plate 270 can be secured to the side bracket 268 using a screw at the apertured tab 308.

In an embodiment in which circuit board 274 is secured to the inner face of cover plate 270, the process of removal of the power circuitry module 262 from the light emitting panel assembly 264 may be similar to the removal process shown in FIG. 4 for the lighting fixture of FIGS. 1-4. For example, the user may decouple driver electrical connector 295 in order to disconnect power circuit 274 from LEDs strip 293. (The source electrical connector, and another driver electrical connector to LEDs strip 294, are not shown in FIG. 17). The user may decouple the source electrical connector and driver electrical connector after removing and slightly separating the cover plate 270 from the side bracket 268 in order to provide access to these electrical connector portions.

Referring again to FIGS. 16 and 17, the frame 276 of light emitting panel assembly 264 includes a bezel at the front surface of the light, and a rear cover 297. The central portion of rear cover 297 serves as a platform to support the substantially flat light emitting diode (LED) panel, not shown. Shoulders 298 at the outer edges of rear cover 297 house LED strips 293, 294 respectively mounted on inside brackets 299, 296. Inside brackets 296, 299 advantageously serve as heat sinks to dissipate heat generated by LEDs 293 and 294. Light fixture 260 includes a side bracket 286 at the opposite edge from side bracket 268; these side brackets include mounting tabs 287 at the four corners of light fixture 260. Mounting tabs 287 may comprise three-position tabs (0°, 90°, 180°) as described in U.S. Pat. Pub. No. 20130044512, entitled "FLAT PANEL LIGHTING DEVICE AND RETROFIT KIT," published Feb. 21, 2013 (Ser. No. 13/473,918, filed May 17, 2012).

U.S. Pat. Pub. No. 20130044512 also discloses another feature of lighting fixture 260: wiring compartments at the edge of light fixture 260 (side bracket 286). Wiring compartments, defined in part by side bracket 286, are accessed by two apertures respectively covered by knockout bracket 278 and knockout bracket 280. Knockout brackets 278 and 280 respectively include knockout apertures 282, 284, which provide ingress points for receiving AC power from an external source. Knockout brackets 278, 280 may be secured within the access apertures of side bracket 280 using the mechanism described above for side bracket 268 and cover plate 270.

U.S. Pat. Pub. No. 20130044512 additionally discloses a further feature of lighting fixture 260: a central wire-way 288 extending between side bracket 268 and side bracket 286. Wire-way 288 serves as a cover (in combination with rear cover 297) for wires or cables routed between side bracket 268 and side bracket 286. Wire-way 288 also serves as a cover for wires routed between side bracket 268 and a knockout bracket 292 secured to central aperture 290 of wire-way 288. In addition, wire-way 288 may provide additional stiffness of light fixture 260. Knockout bracket 292 advantageously includes knockout aperture 291, and provides a central wiring ingress point similarly to the edge wiring ingress provided by knockout brackets 278, 280. Knockout bracket 292 may be secured to central wire-way 288 using the same mechanism as described above for side bracket 268 and cover plate 270.

Figure 20:
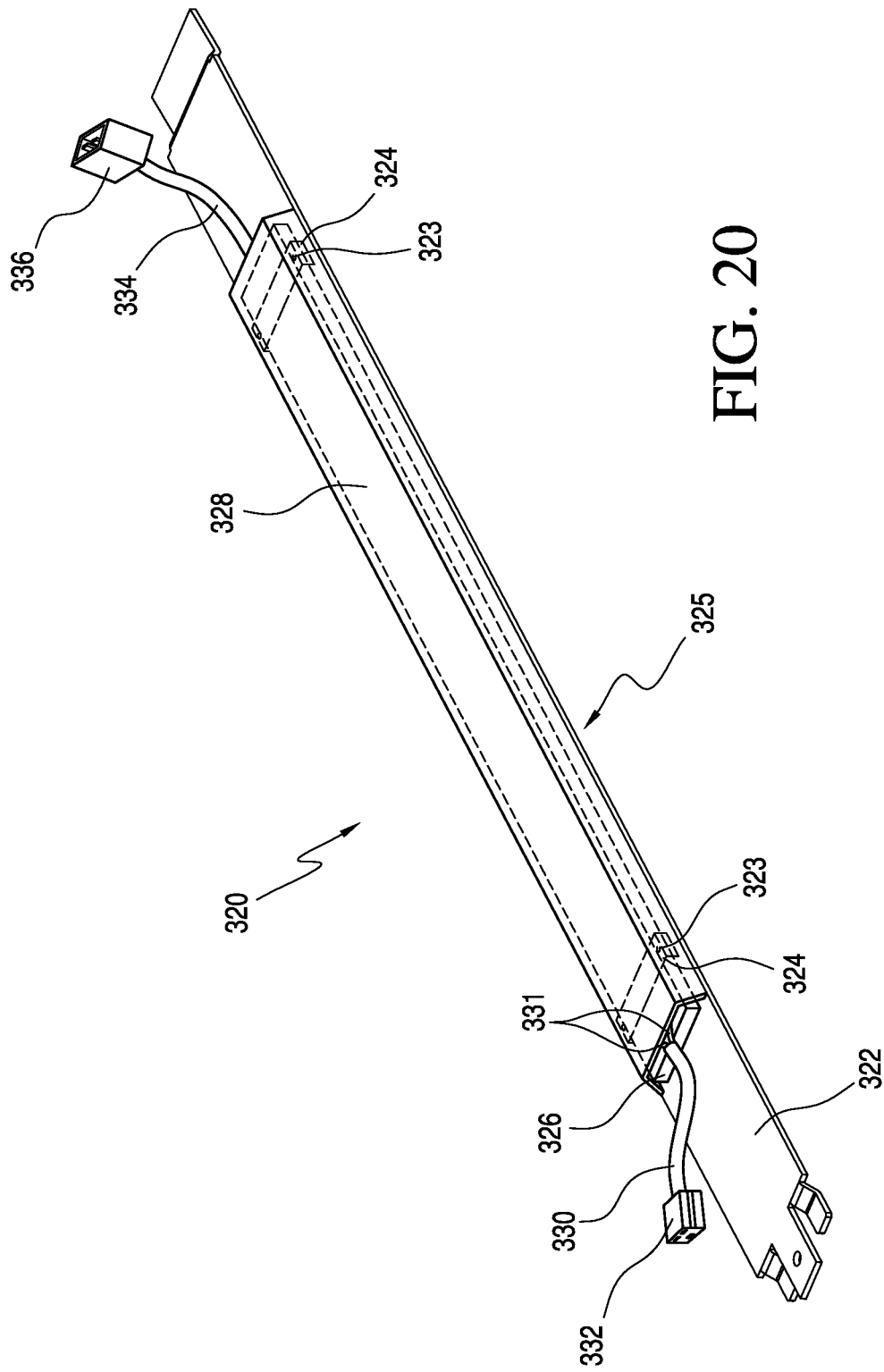
FIG. 20 is a perspective view of a power circuitry module in accordance with a seventh embodiment of the invention.

FIG. 20 shows an additional embodiment of power circuitry module 320 in which a power circuit 325 is mounted to the inner face of cover plate 322. Cover plate 322 can take the form of cover plate 270 shown in FIGS. 19A, 19B. Power circuit 325 includes a circuit board 326 packaged in encapsulation 328 of a generally trapezoidal configuration. Encapsulation 328 is formed of a hard plastic material that is classified 5VA under the UL 94 plastics flammability standard released by Underwriters Laboratories. Circuit board 326 is secured to the inner face of cover plate 322 via mounting tabs or clips 324 located near the ends of circuit board 326, e.g., with fasteners 323.

Power circuitry module 320 includes a driver electrical connector at the near end, including jacketed leads 330 (DC wires 331 within jacket 330), terminating at female electrical connector 332. At the far end a source electrical connector includes jacketed leads 334, terminating at male electrical connector 336. The leads of driver electrical connector and source electrical connector advantageously are long enough to permit removal and replacement of the power circuitry module following removal of the cover plate from the light fixture as described above. However, the jacketed leads 330, 334 should not be too long as this could make it difficult to reinsert the leads within the frame during replacement of power circuitry module 320.

Figure 21:
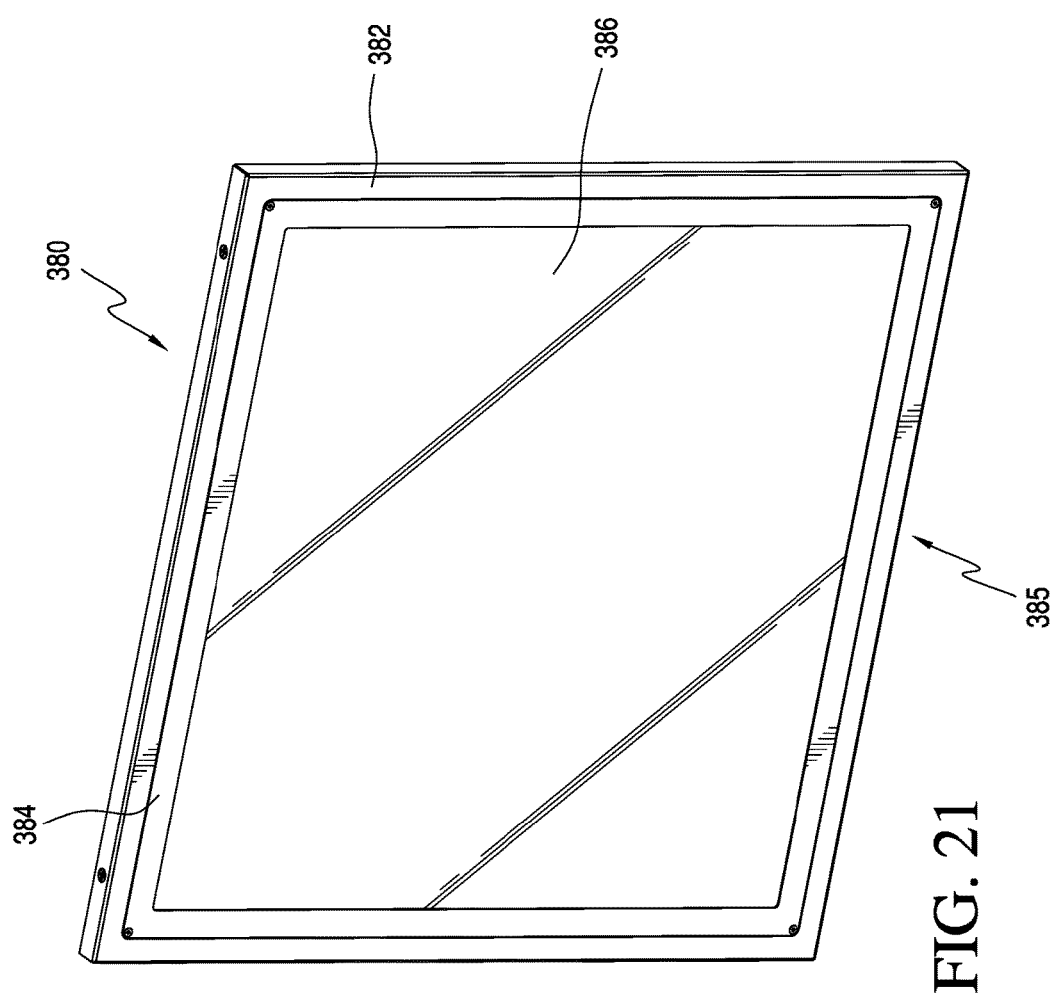
FIG. 21 is a front perspective view of a light fixture in accordance with an eighth embodiment of the invention.

FIGS. 21-26 show a further LED flat panel light fixture embodiment 380, of a design that facilitates field servicing of light fixture 380 while accessing the fixture from the front. A frame 381 of light fixture 380 includes a front frame assembly (or front frame) 385, and a base frame assembly (or base frame) 388. The front frame 385 surrounds a light emission area of substantially flat light emitting diode (LED) panel 386. As best seen in FIG. 21, the front frame 385 includes an outer bezel 382 and an inner bezel 384. Outer bezel 382 is fixed to base frame 388 as is conventional, but inner bezel 384 is movable relative to outer bezel 382 to permit access to interior components of light fixture 380.

Figure 22:
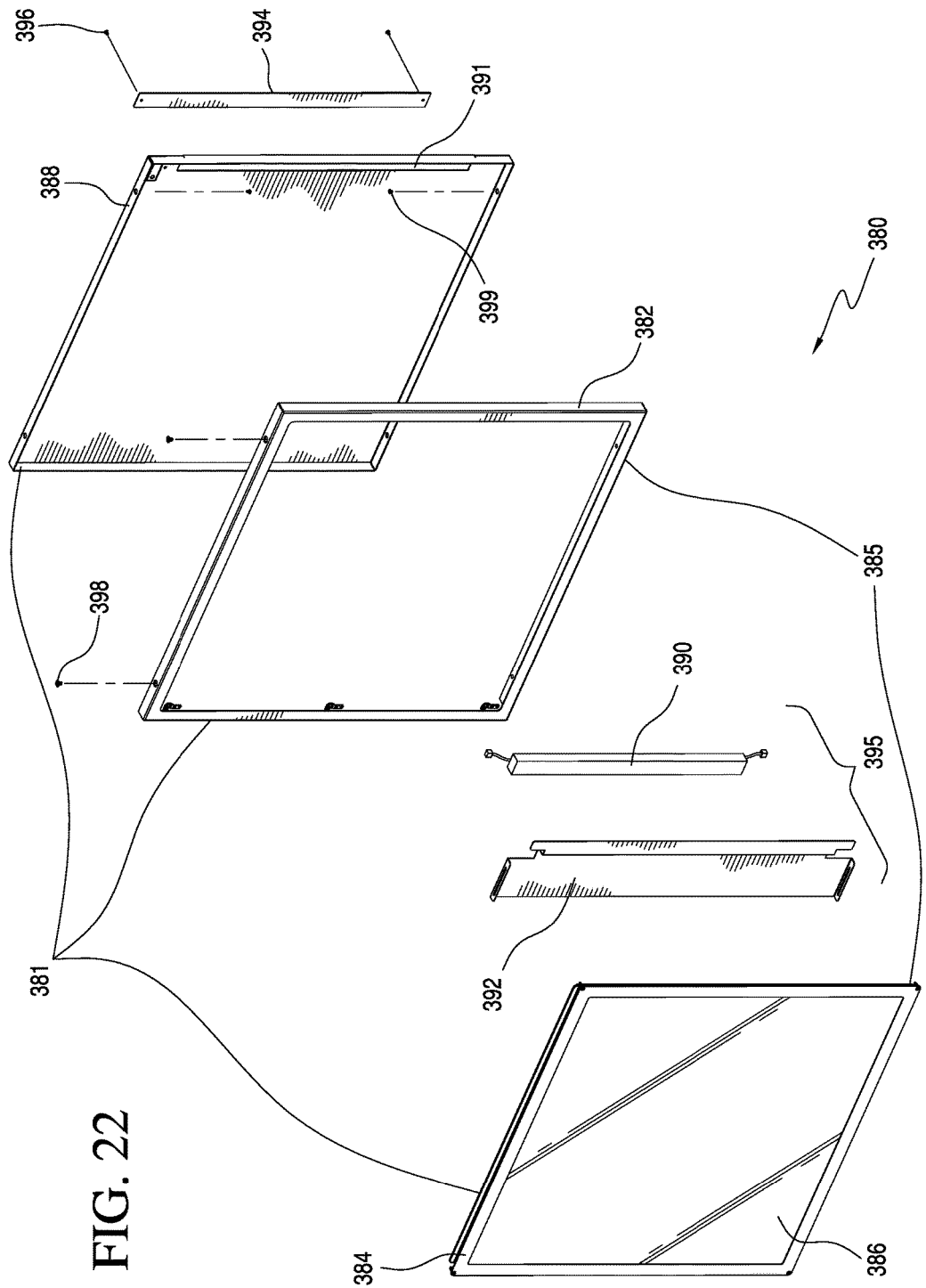
FIG. 22 is an exploded perspective view of the light fixture of FIG. 21.

As seen in the exploded view of FIG. 22, during assembly of light fixture 380 the power circuitry module 395 is mounted to base frame 388 by covering power circuit 390 with power circuit cover bracket 392. Power circuitry module 395 includes power circuit 390, as well as electrical connectors that electrically couple the power circuit to a power supply external to the light fixture and to light emitting diodes (LEDs) in the substantially flat light emitting diode (LED) panel 386. The electrical connectors are not seen in FIGS. 21-25, but may be similar to the mobile electrical connectors shown in FIG. 4, or the fixed electrical connectors shown in FIG. 8. Optionally, to provide a second mode of access to power circuitry module 395 from the rear of light fixture 380, power circuitry module 395 is aligned with an aperture 391 at one edge of base frame, which is closed with cover plate 394 using fasteners 396. Initial assembly includes attachment of hinge assembly 401 to the front frame assembly 385 (in FIG. 22, hinge assembly 401 is shown attached to outer bezel 382 but not yet attached to inner bezel 384). Three hinges 400 of hinge assembly 401 are installed in their closed configuration (FIG. 26), by attaching a first hinge bracket 402 of each hinge 400 to inner bezel 384, and by attaching a second hinge bracket 404 to outer bezel 382, using fasteners not shown. The outer bezel 382 is fixed to the base frame 388 using screws 399. Initial assembly also includes attaching substantially flat light emitting diode (LED) panel 386 at the rear of inner bezel 384 to form inner bezel assembly 384, 386. The front frame assembly 385 is secured by fixing the inner bezel within outer bezel 382 using removable set screws 398. During servicing of light fixture 380, the user can turn set screws 398 to release inner bezel 384 from outer bezel 382.

Figure 23:
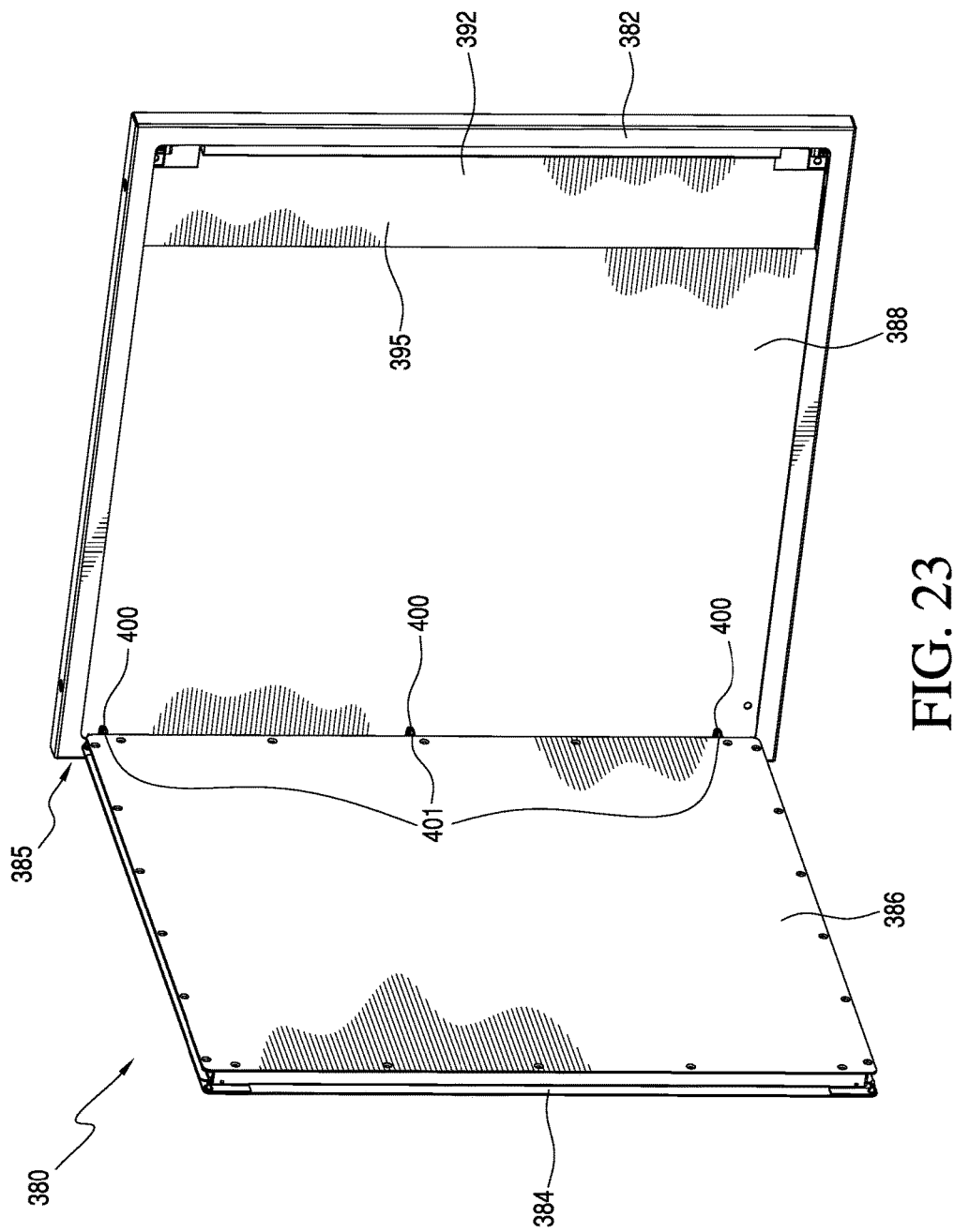
FIG. 23 is a perspective view of the interior of the light fixture of FIG. 21, with the inner bezel subassembly opened.
Figure 24:
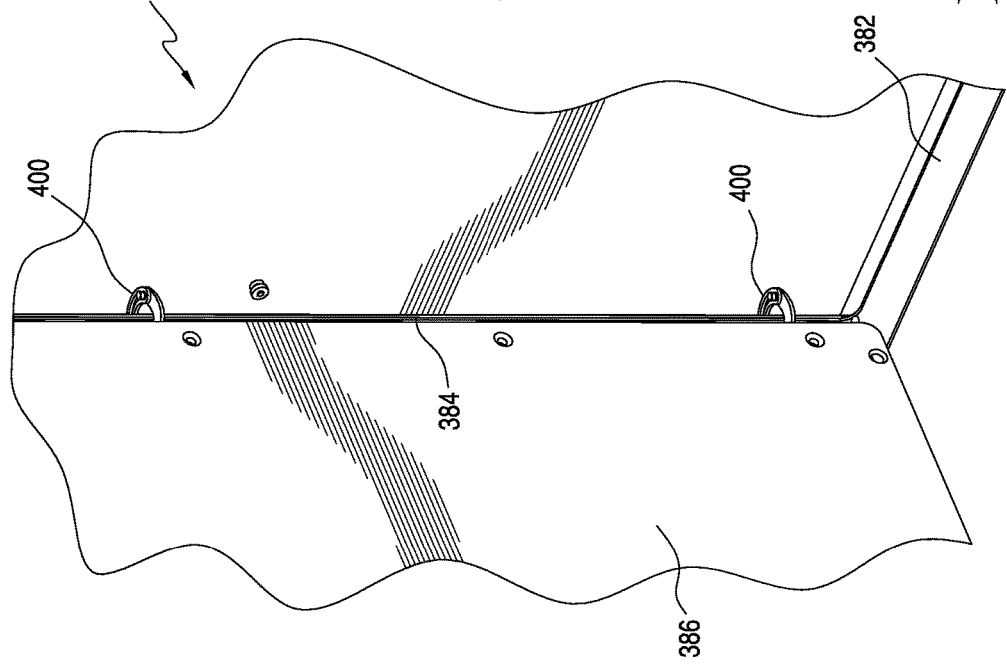
FIG. 24 is a close up perspective view of a portion of the opened light fixture of FIG. 23, showing the hinged coupling of inner bezel subassembly to the outer bezel subassembly.

FIGS. 23 and 24, show inner bezel assembly 384, 386 released from outer bezel 382 during servicing of light fixture 380. Inner bezel assembly 384, 386 has been pivoted out from outer bezel 382 at hinge assembly 401 to expose the interior components of light fixture 380. Power circuitry module 395 (of which only power circuit cover bracket 392 is visible in this view) thereby becomes accessible for servicing. In the front-access fixture of FIGS. 21-26, the power circuitry module 395 may be removed and replaced using a variety of mechanical designs. For example using mechanisms previously described, power circuitry module 395 may be translated to remove module 395 from base frame 388, at the same time decoupling the source electrical connector and decoupling the driver electrical connector (not seen in FIGS. 21-26). Field servicing of light fixture 380 does not require removal of the installed light fixture, or disassembly of the light fixture. For example, power circuitry module 395 can be removed from light fixture 380 and replaced with a new power circuitry module while the fixture is embedded in a recessed ceiling installation, with only the front of the light fixture accessible.

Figure 25:
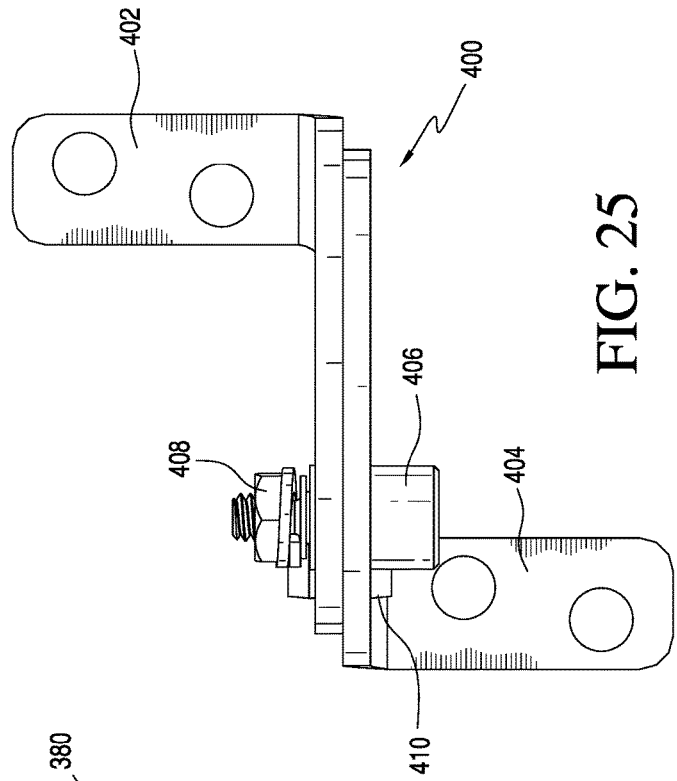
FIG. 25 is a top perspective view of a hinge of the light fixture of FIG. 21, in a closed configuration.

Turning to FIGS. 25 and 26, a hinge 400 includes a first hinge bracket 402 and second hinge bracket 404, joined to each other at arcuate segments to permit relative pivoting movement. First hinge bracket 402 is secured to second hinge bracket 404 using spring pin 410. Pivoting motion of the hinge brackets is guided via a shoulder bolt 406 slidably mounted within slot 405 in second hinge bracket 404, shoulder bolt 406 being retained within slot 405 by hex nut and washer assembly 408.

FIG. 27 shows a further embodiment of power circuitry module 350 in which a power circuit 354 is mounted to the inner surface of cover plate 352. Power circuit 354 includes circuit board 356, covered by clear protective packaging 362, mounted toward one end of cover plate 352. Components of power circuit 354 include an AC section 360 that converts AC power provided by a power supply external to the light fixture to DC power, and a DC section 358 that provides a DC output signal to drive an array of light emitting diodes. AC wires 365 are routed along the circuit board from the far end of the AC section to the end of the DC section, so that both AC lines 366 and DC lines 364 extend from the same (DC) end of the circuit board 356.

In power circuitry module 350, a fixed source electrical connector (AC power in) and fixed driver electrical connector (DC power out) are located together at the same side of the power circuitry module 350. The power circuitry module includes a unitary electrical connector assembly 370 fixed at or near the end of cover plate 352 opposite the end that holds circuit board 356. Electrical connector assembly 370 includes an array of cells or sockets (female configuration), including two driver electrical connector cells (DC section) 374 coupled to DC wiring 364 from circuit board 356, and two electrical source connector cells (AC section) 372 coupled to AC wiring 366 from circuit board 356. An isolation section 376 of electrical connector assembly 370 electrically isolates AC section 372 from DC section 374, and electrical connector assembly 370 may include potting of inserted wiring or pins in cells of (AC and DC) sections 372 and 374 as well as potting of any cells (not shown) in isolation section 376. AC wiring 366 and DC wiring 364 may be lead-shielded as a further protection against electrical interference.

The unitary electrical connector assembly 370 simplifies removal and replacement of power circuitry module 350. Electrical connector assembly 370 may include a first portion of a decouplable driver electrical connector and a first portion of a decouplable source electrical connector, both electrically coupled to the power circuit 354. Power circuitry module 350 may be installed in a light fixture that includes another unitary electrical connector assembly (not shown) configured to mate with electrical connector assembly, the other unitary electrical connector assembly including a second portion of the decouplable driver electrical connector electrically coupled to an array of light emitting diodes (LEDs), and a second portion of the decouplable source electrical connector electrically coupled to an external AC power supply. This arrangement only requires a single step to decouple and recouple the driver electrical connector and source electrical connector during replacement of power circuitry module 350.

This application commonly uses the term "electrically coupled", and other terms such "operatively coupled" or simply "coupled", to describe the electrical communication of various electrical components of the light fixture, and of electrical components of the light fixture to a power source external to the light fixture. Terms such as "decouple" and variations such as "decouplable" describe terminating (or in the case of decouplable, the ability to terminate) the electrical communication of various electrical components of the light fixture, and of electrical components of the light fixture to a power source external to the light fixture. Electrical coupling and decoupling of electrical components of the light fixture may also involve the physical attachment and physical detachment of these electrical components.

This application commonly uses the phrase "releasably attached" to describe the non-permanent mechanical attachment of the power circuitry module to the frame or to the light emitting panel assembly, but other terms may be used such as "removable" and for a process of "removing" or "separating" the power circuitry module from the from the frame or from the light emitting panel assembly. Similarly, the term "releasably attachable" may be used herein, for example to describe providing the light fixture with the power circuitry module and the light emitting panel assembly as separate subassemblies, wherein these subassemblies would be attached prior to installation of the light fixture.

There can be various modifications and variations. For example there can be additional configurations and additional procedures for electrically coupling "electrical connector portions", a term that can be used to some or all of the first source electrical connector portion, first driver electrical connector portion, second source electrical connector portion, and second driver electrical connector portion. Electrical connectors types include but are not limited to male-female connectors. As used in the present application the terms "male configuration" and "female configuration" referring to the electrical connector portions can include a wide variety of male-female connector types. The electrical connector portions can include additional features such as mechanical interlock; these electrical connector portions can include additional configurations such as guide profiles to facilitate joining and electrical coupling the electrical connector portions, and locking structures such as slide-locks. In addition, the process for attaching (and conversely, detaching) the power circuitry module to the light emitting panel assembly can include additional motions such as rotation or lateral sliding to engage an interference fit of the power circuitry module to the light emitting panel assembly or to interlock the electrical connector portions. Furthermore, the source electrical connector, the driver electrical connector, and the electrical connector portions which form these electrical connectors, can use various types of mobile electrical connectors and/or fixed electrical connectors, beyond the types exemplified in this patent application. The phrase "portion of the driver electrical connector" is herein used interchangeably with "driver electrical connector portion", and the phrase "portion of the source electrical connector" is used interchangeably with "source electrical connector portion".

To illustrate aspects of the disclosed technology in a clear and concise manner, the drawings may not necessarily be to scale and certain features may be shown in somewhat schematic form.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A light fixture comprising:
   (a) a light emitting panel assembly comprising a frame and a substantially flat light emitting diode (LED) panel disposed within the frame, said substantially flat light emitting diode (LED) panel including an optically transmissive panel, and an array of light emitting diodes (LEDs) disposed adjacent an edge of the optically transmissive panel and disposed adjacent a first edge of the frame;
   (b) a power circuitry module disposed within the frame adjacent a second edge of the frame and releasably attachable to the light emitting panel assembly, said power circuitry module including a power circuit;
   (c) a decouplable source electrical connector that electrically couples the power circuit to an AC power supply external to the light fixture, wherein the power circuit converts AC power to DC power to drive the array of light emitting diodes (LEDs), and wherein the decouplable source electrical connector is electrically coupled to the AC power supply through a luminaire disconnect; wherein the decouplable source electrical connector comprises a first portion electrically coupled to the power circuit, a second portion electrically coupled to the AC power supply, and a decouplable connection between the first portion and the second portion; and
   (d) a decouplable driver electrical connector that electrically couples the power circuit to the array of light emitting diodes (LEDs);
   wherein the substantially flat light emitting diode (LED) panel and the power circuitry module are disposed side-by-side within the frame; and
   wherein the frame defines an aperture adjacent the second edge of the frame to access the power circuitry module.

2. The light fixture of claim 1, wherein the aperture adjacent the second edge of the frame is configured to solely access the power circuitry module.

3. The light fixture of claim 1, further comprising a cover member releasably attachable to the frame and configured to cover the aperture adjacent the second edge of the frame.

4. The light fixture of claim 1, wherein the second portion of the decouplable source electrical connector is electrically coupled to the AC power supply via the luminaire disconnect.

5. The light fixture of claim 1, wherein the power circuitry module includes a first portion of the decouplable driver electrical connector electrically coupled to the power circuit, and the light emitting panel assembly includes a second portion of the decouplable driver electrical connector electrically coupled to the array of light emitting diodes (LEDs).

6. The light fixture of claim 1, wherein the power circuitry module is configured to be detached and separated from the light emitting panel assembly, and wherein at least one of the decouplable source electrical connector and the decouplable driver electrical connector is configured to be decoupled as the power circuitry module is detached and separated from the light emitting panel assembly.

7. The light fixture of claim 1, wherein the power circuit, the decouplable source electrical connector, and the decouplable driver electrical connector are disposed within a channel defined by the frame between the optically transmissive panel and the second edge of the frame.

8. The light fixture of claim 1, wherein the power circuit comprises a printed circuit board having a length and a width, wherein a length-to-width ratio of the printed circuit board is at least five-to-one.

9. The light fixture of claim 8, wherein the length-to-width ratio of the printed circuit board is at least ten-to-one.

10. The light fixture of claim 1, wherein the frame has a thickness less than about 1.0 inch.

11. The light fixture of claim 1, further including an LEDs module disposed within the frame and containing the array of light emitting diodes (LEDs), wherein the LEDs module is releasably attachable to the frame at the first edge of the frame.

12. A light fixture comprising:
   (a) a light emitting panel assembly comprising a frame and a substantially flat light emitting diode (LED) panel disposed within the frame, said substantially flat light emitting diode (LED) panel including an optically transmissive panel, and an array of light emitting diodes (LEDs) disposed adjacent the optically transmissive panel;
   (b) a power circuitry module disposed within the frame adjacent an edge of the frame and releasably attachable to the light emitting panel assembly, said power circuitry module including a power circuit, wherein the substantially flat light emitting diode (LED) panel and the power circuitry module are disposed side-by-side within the frame;
   (c) a decouplable source electrical connector that electrically couples the power circuit to an AC power supply external to the light fixture, wherein the power circuit converts AC power to DC power to drive the array of light emitting diodes (LEDs); wherein the decouplable source electrical connector comprises a first portion electrically coupled to the power circuit, a second portion electrically coupled to the AC power supply, and a decouplable connection between the first portion and the second portion; and (d) a decouplable driver electrical connector that electrically couples the power circuit to the array of light emitting diodes (LEDs);

wherein the frame defines an aperture adjacent the edge of the frame configured to solely access the power circuitry module, and wherein the light fixture includes a cover member that is releasably attachable to the frame and is configured to cover the aperture.

13. The light fixture of claim 12, wherein the array of light emitting diodes (LEDs) is disposed adjacent an edge of the optically transmissive panel and disposed adjacent a second edge of the frame.

14. The light fixture of claim 12, wherein the second portion of the decouplable source electrical connector is electrically coupled to the AC power supply via a luminaire disconnect.

15. The light fixture of claim 12, wherein the power circuit comprises a printed circuit board having a length and a width, wherein a length-to-width ratio of the printed circuit board is at least five-to-one.

16. A light fixture comprising:
(a) a light emitting panel assembly comprising a frame and a substantially flat light emitting diode (LED) panel disposed within the frame, said substantially flat light emitting diode (LED) panel including an optically transmissive panel, and an array of light emitting diodes (LEDs) disposed adjacent an edge of the optically transmissive panel and disposed adjacent a first edge of the frame;

(b) a power circuitry module disposed within the frame adjacent a second edge of the frame and releasably attachable to the light emitting panel assembly, said power circuitry module including a power circuit, wherein the power circuit comprises a printed circuit board having a length and a width, wherein a length-to-width ratio of the printed circuit board is at least five-to-one;

(c) a decouplable source electrical connector that electrically couples the power circuit to an AC power supply external to the light fixture, wherein the power circuit converts AC power to DC power to drive the array of light emitting diodes (LEDs); wherein the decouplable source electrical connector comprises a first portion electrically coupled to the power circuit, a second portion electrically coupled to the AC power supply, and a decouplable connection between the first portion and the second portion; and (d) a decouplable driver electrical connector that electrically couples the power circuit to the array of light emitting diodes (LEDs);

wherein the frame has a thickness less than about 1.0 inch, and the substantially flat light emitting diode (LED) panel and the power circuitry module are disposed side-by-side within the frame.

17. The light fixture of claim 16, wherein the frame defines an aperture adjacent the second edge of the frame configured to solely access the power circuitry module, and wherein the light fixture includes a cover member that is releasably attachable to the frame and is configured to cover the aperture.

* * * * *